United States Patent
Thornton

(10) Patent No.: US 7,161,557 B2
(45) Date of Patent: Jan. 9, 2007

(54) SELECTIVELY UPDATING A DISPLAY IN A MULTI-DISPLAY SYSTEM

(75) Inventor: Barry W. Thornton, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 559 days.

(21) Appl. No.: 10/458,853

(22) Filed: Jun. 11, 2003

(65) Prior Publication Data

US 2003/0212811 A1  Nov. 13, 2003

Related U.S. Application Data

(63) Continuation-in-part of application No. 10/198,719, filed on Jul. 18, 2002.

(60) Provisional application No. 60/370,889, filed on Apr. 8, 2002.

(51) Int. Cl.
 G09G 5/00 (2006.01)

(52) U.S. Cl. ......................................... 345/2.1; 345/1.1

(58) Field of Classification Search .......... 345/1.1–2.3, 345/157
 See application file for complete search history.

(56) References Cited

U.S. PATENT DOCUMENTS

| | | | |
|---|---|---|---|
| 6,119,146 A | 9/2000 | Heller et al. | 709/203 |
| 6,759,996 B1* | 7/2004 | Someya et al. | 345/1.1 |
| 2001/0000539 A1 | 4/2001 | Heller et al. | 710/62 |
| 2002/0194623 A1* | 12/2002 | Rees | 725/148 |
| 2003/0128798 A1* | 7/2003 | Mizuyabu et al. | 345/204 |

FOREIGN PATENT DOCUMENTS

| | | |
|---|---|---|
| EP | 0498995 | 8/1992 |
| EP | 1257125 | 11/2002 |
| JP | 2000352962 | 12/2000 |

OTHER PUBLICATIONS

Sun Microsystems Press Release; dated Dec. 6, 2001; "http://www.sun.com/smi/Press/sunflash/2001-12/sunflash.2001 1206.2.html".*
Matrox Graphics Inc: "Matrox Professional Graphic Solution for 2D & 3D Workstations", May 2003, XP002301462, pp. 3-5.
International Search Report, PCT/US2004/018579, mailed Nov. 2, 2004.

* cited by examiner

*Primary Examiner*—Amr A. Awad
*Assistant Examiner*—Steven Holton
(74) *Attorney, Agent, or Firm*—Meyertons Hood Kivlin Kowert & Goetzel, P.C.; Jeffrey C. Hood; Mark S. Williams

(57) ABSTRACT

System and method for selectively updating a display in a multiple display device system. Software executing on the computer system analyzes information associated with the display devices, e.g., respective levels of user activity (e.g., peripheral activity), graphics activity (e.g., changes in image data), and/or application activity, associated with each display device, optionally generating priority information associated with the display devices. The display devices are updated in accordance with the analysis using two or more update rates, optionally based on the priority information, e.g., by generating a sequence of video frames based on the analysis, each video frame including a video image and frame identifier designating a display device, and transmitting the sequence over the cable to a plurality of frame grabbers, each frame grabber examining the sequence of video frames, selecting a video frame based on the frame identifier, and forwarding the video frame to the designated display device.

24 Claims, 16 Drawing Sheets

Video Frame Sequence without Selective Updates
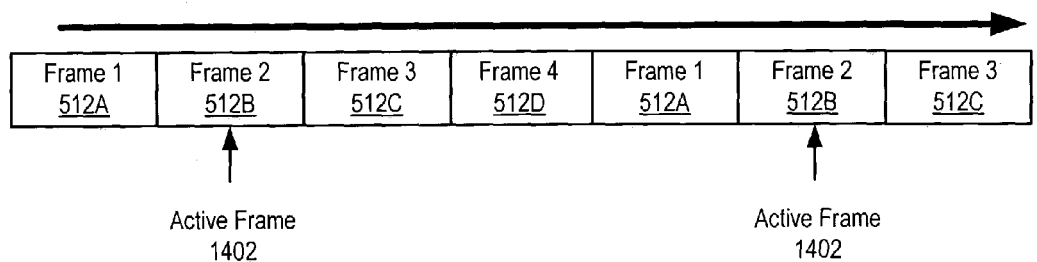
Video Frame Sequence with Selective Updates
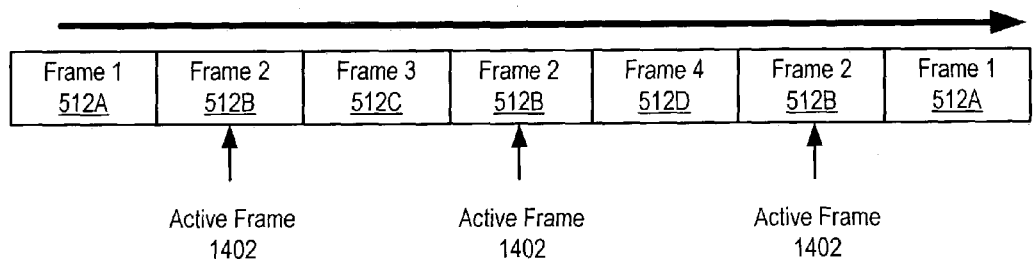
Figure 14

SELECTIVELY UPDATING A DISPLAY IN A MULTI-DISPLAY SYSTEM

CONTINUATION INFORMATION

This application is a Continuation-In-Part of U.S. patent application Ser. No. 10/198,719 entitled "CONNECTING MULTIPLE MONITORS TO A COMPUTER USING A SINGLE CABLE", filed Jul. 18, 2002, which claims priority to U.S. provisional application Ser. No. 60/370,889 entitled "CONNECTING MULTIPLE MONITORS TO A COMPUTER USING A SINGLE CABLE" filed Apr. 8, 2002.

BACKGROUND OF THE INVENTION

1. Field of the Invention

The present invention relates generally to operation of multiple display devices with a single computer over a single cable, and more specifically, to selective updating of multiple display devices.

2. Description of the Related Art

The components of a computer system (such as PCs, minicomputers and mainframes) may be divided into two functional units—a computing system and a human interface (or "HI") to the computing system. For a PC, the computing system may be the CPU, memory, hard drive, power supply and similar components. The computing system may be comprised in a chassis which holds the motherboard, power supply, hard drive and the like. The computer system may also be implemented in other forms, such as a blade computer as described in U.S. Pat. No. 6,012,101 entitled "Computer Network Having Commonly Located Computer Systems", or U.S. patent application Ser. No. 09/728,667 entitled "Computer On A Card With A remote Human Interface" filed Dec. 1, 2000. The human interface, on the other hand, may comprise those devices that humans use to transfer information to and/or receive information from the computing system. The most commonly recognized devices which form part of the human interface with the computing system include the monitor, keyboard, mouse and printer. The human interface may also include a variety of other devices, such as a joystick, trackball, touchpad, microphone, speakers, and telephone, as well as other devices too numerous to specifically mention.

Increasingly, HIs for computer systems include multiple monitors for presenting large amounts of information to a user. For example, financial or stock analysis workstations typically include at least two monitors to display various tables, graphs, documents, and program interfaces to the analyst. Generally, this is accomplished through the use of multiple (usually two) video cards in the computer, although there are some video cards which support two independent video outputs. Drawbacks to this approach include the cost of providing multiple video cards (or special video cards with multiple outputs) for the computer system, as well as the limitation on the number of monitors supported (usually two or three), due to the limited number of slots and/or buses available on the computer.

In most multi-display computer systems, e.g., current PC architectures, the human interface (e.g., the display monitor, mouse, and keyboard, etc.) is closely located to the computer system, by a distance typically less than about 10 to 15 feet. This distance constraint severely limits the placement of the multiple video monitors in a system, and thus, limits the usability and flexibility of the system. In some current multi-display computer systems, the operational distance from the computer to the video displays has been extended, e.g., by converting digital video signals to analog signals for propagation over distances up to ~100 feet, and by using compensation amplifiers in the case of longer cable runs.

However, current approaches to extended multiple monitor computer systems require individual cables for each monitor. In other words, current approaches include a hub which connects to the computer, and which has multiple outputs for connecting with respective multiple monitors via respective multiple cables. Thus, if the computer system includes four monitors at the HI location, then four separate cables must be run from the hub to the displays, increasing the expense of the system.

Additionally, in the installation of cabling, the cost of pulling the cable, e.g., through walls, ceilings, etc., may greatly exceed the cost of the cable, and so the use of multiple cables to connect the monitors may involve substantial expense. These problems may be illustrated more clearly by FIG. 1 and its associated text.

FIG. 1—Computer System With Multiple Display Devices (Prior Art)

FIG. 1 illustrates a computer system which supports multiple display devices, i.e., computer monitors, according to the prior art. As FIG. 1 shows, in the prior art approach, a computer 102 is coupled to a hub 111, e.g., via a cable 104. The hub 111, in turn, is coupled to a plurality of computer displays, i.e., computer monitors 108A–108D via respective cables 104A–104D. Multiplexed video signals, and optionally, I/O device signals, are sent from the computer 108 to the hub 111, where the multiplexed video signals are separated and routed over the appropriate cables 104 to respective monitors 108. Thus, as FIG. 1 shows, the prior art approach necessitates that multiple cables (e.g., 104A–104D) be run from the hub 111 to distribute the video signals. In this prior art approach, the hub 111 receives a single large video frame or image, and partitions the frame into a plurality of sub-frames, each of which constitutes a frame or image for a respective monitor. The processing involved in decomposing the single large frame into the respective sub-frames may require complex processing and may greatly limit the flexibility of the system regarding changes in configuration of the system, e.g., addition or subtraction of monitors from the system, changes in resolution of the images, etc.

The parallel couplings between the hub 111 and the monitors 108 may also require substantially more cable than a single monitor system. As was mentioned above, generally, the cost of running the cable exceeds that of the cable itself, thus, the use of multiple parallel cables to couple the monitors to the hub may involve significant expense, in that in some embodiments, each of the cables 104A–104D may have to be "pulled" through walls, floors, etc., during installation of the system.

In one approach to supplying content for display to multiple monitors, as disclosed in U.S. patent application Ser. No. 10/198,719 titled "Connecting Multiple Monitors To A Computer Using A Single Cable", filed Jul. 7, 2002, whose inventor is Barry Thornton, video frames are multiplexed and sequentially sent to the monitors on a single cable. Each monitor (or a respective frame-grabber coupled to the monitor) selects and records the frame or image it is to display. This frame or image is then played back to the monitor at a refresh rate appropriate to that monitor. However, in this process the actual refresh rate of the data may be considerably slower than the refresh rate of the frame to the associated monitor. Thus, the cursor location on the screen that is displaying the cursor is generally updated at a slower rate than in the case where a single monitor is used. In other words, because the video frames are multiplexed, the image data is consequently updated less frequently than in a single monitor system, possibly resulting in poor performance or responsiveness from the user's perspective.

Thus, improved systems and methods for updating a display in a multi-display system are desired.

SUMMARY OF THE INVENTION

Various embodiments of a system and method for selectively updating a display in a multiple display device system are disclosed. In one embodiment, a computer system is located at a first location, and is coupled to a human interface through a cable. The human interface may be located at a second location remote from the first location. In one embodiment, bus extension technologies may be used to transmit the video frames, e.g., the image data, from the computer system to the plurality of display devices. The human interface may include a plurality of display devices and a plurality of frame grabbers, described below.

In one embodiment, the computer system includes a video processor operable to store a plurality of video images. The video processor is further configured to transmit a sequence of video frames, each video frame including a video image and a frame identifier. The video processor may be configured to transmit the sequence of video frames in a time-division multiplexed fashion. The video frames are transmitted across the cable to the plurality of frame grabbers, each of which couples the cable to one of the plurality of display devices, e.g., monitors. Each frame grabber is configured to examine the sequence of video frames, and to select a video frame from the sequence based on the frame identifier, which designates the specific display device upon which the video frame is to be displayed. In one embodiment, a frame in the sequence that is not designated for the specific display device may be allowed to pass through the frame grabber, as well as any subsequent frame grabber, until reaching a frame grabber associated with the display device designated by its frame identifier. In another embodiment, even if a frame is grabbed by a frame grabber, the frame may be passed on to subsequent frame grabbers, so that multiple frame grabbers may select the same frame for display on their respective display devices.

In one embodiment, the computer is a blade computer. The blade computer may execute a software driver that generates video images, places the video images into frames, and inserts a frame identifier (ID) into the each video frame. The video frames may then be transmitted sequentially onto the serial cable. In one embodiment, the serial cable may be a CAT 5 cable. The frames may be received by frame pods coupled to the serial cable, each of which includes a frame grabber, and is coupled to a display device, and extracted based on the frame IDs. In one embodiment, the frame pods may be located in their respective display devices.

The computer may be part of a computing system that includes a plurality of blade computers, where the computing system may be configured to allow a large number of display devices, e.g., monitors, to be coupled to computers by single cables.

Information associated with the plurality of display devices, e.g., computer monitors, may be analyzed. In one embodiment, the analyzing may include determining respective levels of user activity associated with each display device, e.g., determining respective levels of peripheral activity associated with each display device, such as, for example, mouse movement, keyboard entry, head-tracking activity, touch-screen events, etc.

In another embodiment, the analyzing may include determining respective levels of graphics activity associated with each display device, such as determining respective rates of change in image data associated with each display device. For example, if a first of the display devices were displaying a movie, while the others displayed documents, spreadsheets, or other relatively static images, the first display device may have a higher graphics activity than the others.

In yet another embodiment, the analyzing may include determining respective levels of application activity associated with each display device. For example, a determination may be made as to which display device is displaying or is associated with an active application, e.g., the current active window. Of course, in other embodiments, various combinations of these types of determinations may be made, where associated metrics may be computed and/or combined, e.g., using weighted normalized sums, fuzzy logic, etc., to determine relative activity associated with each display device.

In one embodiment, priority information associated with the display devices may optionally be generated based on the above analyzing. For example, a respective metric for each display device may be computed indicating a degree to which a user's attention is directed to the display device. In one embodiment, a variety of metrics may be determined for each device, then combined into a single metric, e.g., using weighted sums or fuzzy logic. The priority information may then be used to rank the display devices and/or to determine relative update rates, as described below.

Finally, the plurality of display devices may be updated in accordance with the analyzing, and optionally, based on the priority information, where the plurality of display devices are updated using two or more update rates. For example, in an embodiment where generating priority information includes computing a respective metric for each display device indicating a degree of activity associated with the display device, updating the plurality of display devices based on the priority information may include updating image data displayed on each of said plurality of display devices at an update rate corresponding to said respective metric. In other words, image data for the respective display devices may be updated at different rates, depending upon the analysis of activity associated with the display.

An important distinction should be made between the update rate and the refresh rate for a display device. A particular frame may be presented repeatedly without update to a display device, e.g., a monitor, at the monitor's hardware refresh rate, typically between 60 MHz and 75 MHz. Said another way, the update rate for a display device is typically slower than its hardware refresh rate, e.g., an update rate may be on the order of 30 frames per second, as opposed to the megahertz ranges of display device hardware refresh rates, although higher update rates are also contemplated. In a preferred embodiment, the analyzing and updating is performed in an iterative manner. In other words, the metrics determining if and how to perform the selective updating may be computed repeatedly, and thus, the respective update rates for the plurality of display devices may change over time.

The method described above is preferably performed in an iterative manner, where the analysis and selective updating are executed periodically, e.g., at a nominal frame rate, to monitor and adjust the video display process for a substantially improved user experience.

Thus, in one embodiment, the sequence of video frames is generated based on the analysis, where each video frame includes a video image and a frame identifier, and where each of the video images is stored in a video processor in a computer system. As described above, the sequence of video frames is transmitted over a cable, e.g., a CAT 5 cable, to a plurality of frame grabbers, where each frame grabber is coupled to the cable and a respective one of the plurality of display devices. Each frame grabber examines the sequence of video frames, selects a video frame from the sequence of video frames based on the frame identifier, and forwards the video frame to the designated one of the plurality of display devices.

In one embodiment, the method described above relates to selectively updating display devices based on cursor (e.g., mouse) movement, where determination of an active frame (the cursor frame) is used to determine the video frame sequence sent to the plurality of display devices.

For example, a cursor location or position may be determined, e.g., software, such as driver software, executing on computer system may determine on which display device the cursor is currently displayed, e.g., may determine the cursor frame, as well as the cursor's position on that display device, e.g., the cursor's position in the video frame for that display device, e.g., the cursor's position on the display screen or viewable region. It is noted that the cursor position may correspond to relative positions or movement of any type of pointing device, including, but not limited to, a mouse, keyboard, trackball, head-tracking device, touchscreen, touch-pad, stylus, and light-pen, among others.

Once the cursor position is determined, a determination may be made as to whether the cursor has moved, e.g., by comparing the current position of the cursor with a previous position, where a difference between the two positions indicates that cursor movement has occurred. If no cursor movement is detected, then the method may simply insert the next video frame into the frame sequence, e.g., for transmission to the display devices. In other words, if no cursor movement is detected, then no selective updating may occur, i.e., no active frame is determined, and thus, the normal video frame sequence is used.

If cursor movement is detected, then the current cursor location or position may be saved, e.g., stored in a memory medium of the computer system, and the video frame with the cursor may be inserted into the video frame sequence for transmission to the plurality of display devices. In other words, the cursor frame may be sent for display, after which the next frame may be sent. Said another way, the cursor frame is determined to be the active frame, and may be inserted into the video frame sequence before the normal "next" frame in the sequence, thereby selectively updating the image data containing the (moving) cursor at a higher rate than the image data of video frames associated with the other display devices.

The method is preferably performed in an iterative manner, where after the next frame is sent, the method continues, determining a new current cursor location, and so forth, as described above. Thus, over a series of these iterations, if the cursor continues to move, then the determined cursor frame will be inserted or interleaved between each of the other frames, thereby updating that frame at an effective update rate greater than that of the other frames. Thus, the active frame may be updated at a first rate, and the other frames updated at a second rate, where the first rate is greater than the second.

Thus, the method described above relating to cursor movement is an exemplary embodiment of the more general method described previously, wherein the active frame is determined using respective levis of peripheral active associated with each display device. More specifically, determining respective levels of peripheral activity associated with each display device may include determining a cursor location for a current iteration, where the cursor location is associated with a first display device of the plurality of display devices, and determining if the cursor location has changed since a previous iteration. In this embodiment, updating the plurality of display devices in accordance with said analyzing includes updating the first display device at a first update rate if the cursor location has changed since a previous iteration, and at a second update rate if the cursor location has not changed since the previous iteration. The others of the plurality of display devices are updated at the second update rate, where the first update rate is greater than the second update rate.

Additionally, in one embodiment, updating the plurality of display devices may include generating a sequence of video frames based on the first update rate and the second update rate, where each video frame is targeted to a respective display device. In one embodiment, a cursor video frame may be periodically inserted into the sequence of video frames in accordance with the first update rate, where each cursor frame displays the cursor in an associated video image, and where a position of the cursor is responsive to movements of a pointing device.

It should be noted that in other embodiments, different update rates may be determined based on various activity metrics, as noted above. For example, rather than just two update rates, the method may determine respective update rates for each of the display devices or video frames, where each update rate is computed based on one or more metrics calculated or measured for that display device. Thus, the most active display may be updated most frequently, the next most active display(s) may be updated less frequently, the third most active display(s) updated yet less frequently, and so on.

Thus, various embodiments of the systems and methods described herein may provide selective updating of display devices based on activity associated with the display devices, and may thereby improve the quality of a user's experience, e.g., by increasing the responsiveness of the human interface, e.g., of the cursor display, by improving graphical data update rates for dynamic images, and so forth.

BRIEF DESCRIPTION OF THE DRAWINGS

Other aspects of the invention will become apparent upon reading the following detailed description and upon reference to the accompanying drawings in which:

FIG. 14 illustrates selective video frame sequencing, according to one embodiment;

Figure 1:
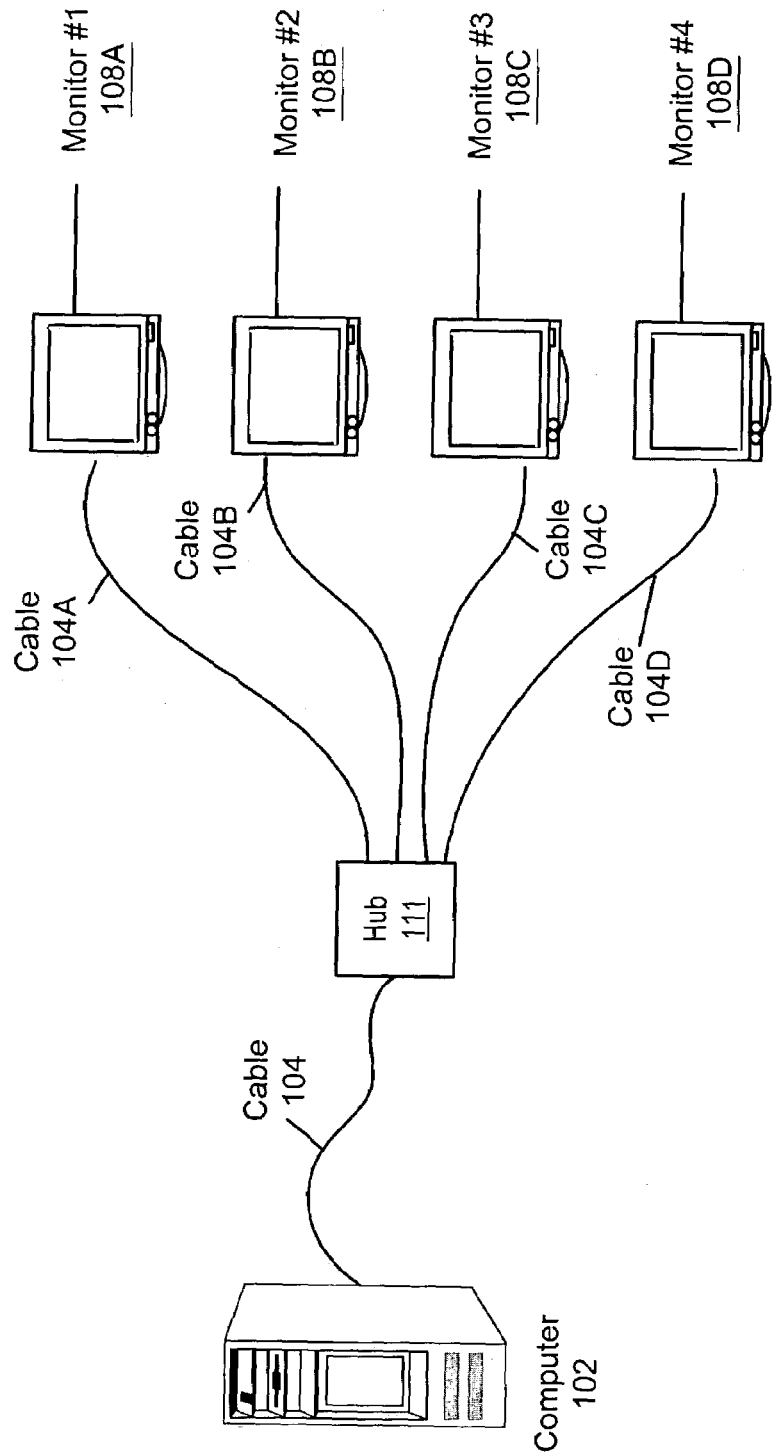
FIG. 1 (Prior Art) illustrates a prior art computer system having a computer and multiple display devices connected to the computer through a hub.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following patents and patent applications are hereby incorporated by reference as though fully and completely set forth herein:

U.S. Pat. No. 6,012,101 titled "Computer Network Having Commonly Located Computer Systems" issued on Jan. 4, 2000, whose inventors are Andrew Heller, Barry Thornton, Daniel Barrett, and Charles Ely;

U.S. Pat. No. 6,119,146 titled "Computer Network Having Multiple Remotely Located Human Interfaces Sharing a Common Computing System" issued on Sep. 12, 2000, whose inventors are Andrew Heller, Barry Thornton, Daniel Barrett, and Charles Ely;

U.S. Pat. No. 6,038,616 titled "Computer System With Remotely Located Interface Where Signals are Encoded at the Computer System, Transferred Through a 4-wire Cable, and Decoded at the Interface" issued on Mar. 14, 2000, whose inventors are Andrew Heller, Barry Thornton, Daniel Barrett, and Charles Ely;

U.S. Pat. No. 6,070,214 titled "Serially Linked Bus Bridge For Expanding Access Over A First Bus To A Second Bus" issued on May 30, 2000, whose inventor is Frank Ahern;

U.S. Pat. No. 5,764,924 titled "Method And Apparatus For Extending A Local PCI Bus To A Remote I/O Backplane" issued on Jun. 9, 1998, whose inventor is Soon Chul Hong;

U.S. Pat. No. 6,003,105 titled "Long-Haul PCI-to-PCI Bridge" issued on Dec. 14, 1999, whose inventors are Dominique Vicard, Jean-Paul Moiroux, and Pierre-Yves Thoulon;

U.S. patent application Ser. No. 09/728,667 titled "Computer On A Card With A Remote Human Interface" filed on Dec. 1, 2000, whose inventors are Andrew Heller and Barry Thornton; and U.S. patent application Ser. No. 09/728,669 titled "A System Of Co-Located Computers In a Framework Including Removable Function Modules for Adding Modular Functionality" filed on Dec. 1, 2000, whose inventor is Barry Thornton.

U.S. patent application Ser. No. 09/619,989 titled "System and Method for Providing a Remote Universal Serial Bus" filed on Jul. 20, 2000, whose inventor is Barry Thornton.

U.S. patent application Ser. No. 09/680,760 titled "System and Method for Combining Computer Video and Remote Universal Serial Bus In An Extended Cable" filed on Oct. 6, 2000, whose inventor is Barry Thornton.

U.S. patent application Ser. No. 10/198,719 titled "Connecting Multiple Monitors To A Computer Using A Single Cable", filed on Jul. 18, 2002, whose inventor is Barry Thornton.

Figure 2:
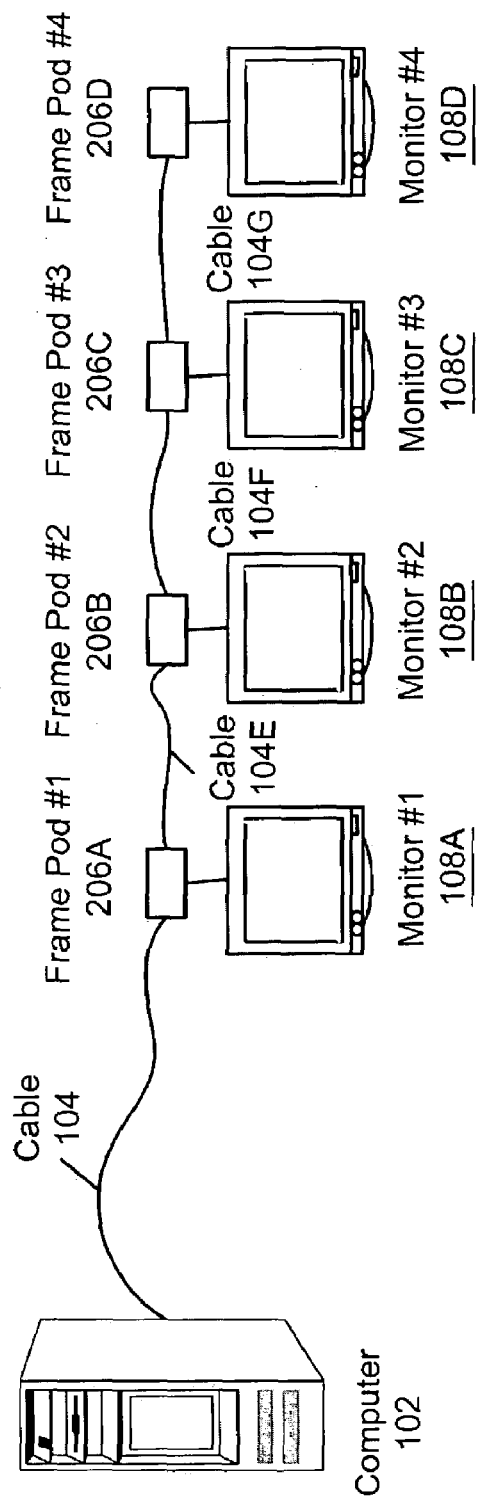
FIG. 2 illustrates a multi-monitor computer system, according to one embodiment of the present invention.

FIG. 2—Computer System With Multiple Display Devices

FIG. 2 illustrates a computer system which supports multiple display devices, i.e., computer monitors, according to one embodiment of the present invention. The computer at the first location, the monitors and frame pods at the second location, and the human interface may include other devices not shown here. As FIG. 2 shows, in this approach, the computer 102 may couple to a first frame pod 206A via the cable 104. As FIG. 2 also shows, the first frame pod 206A may couple to monitor 108A. Additionally, the first frame pod 206A may couple to a second frame pod 206B, which may couple to monitor 108B, as well as frame pod 206C. Frame pod 206C may couple to monitor 108C and frame pod 206D. Finally, frame pod 206D may couple to monitor 108D. Each frame pod 206D may comprise a frame grabber as described below. In another embodiment, the frame pods may be implemented in each of their respective monitors, and hence separate frame pods may are not necessary. It should be noted that, although the system shown includes four monitors, that in various embodiments, the system may also include a greater or lesser number of monitors, and that the methods disclosed herein apply equally. Furthermore, other embodiments are possible and contemplated wherein each of the frame grabbers is stored within a single box. In general, a wide variety of configurations for arranging the frame pods/grabbers are possible and contemplated.

Thus, the frame pods 206/monitors 108 may be linked to the computer 102 in serial fashion via the cable 104. It should be noted that in another embodiment, the computer 102 may couple to the first frame pod 206A through a network, such as the Internet.

In one embodiment, the computer 102 stores a video image or frame for each of the monitors 108A–D. The computer 102 generates multiplexed video sequences, wherein the video frames are multiplexed together in a time-division multiplexed fashion. In another embodiment, the video frames may be multiplexed together using frequency division multiplexing. The multiplexed video signals may be transmitted from the computer 102 over the cable 104 to the first frame pod 206A. The first frame pod 206A may extract video signals targeted to the monitor 108A, if any, and transmit the extracted signals to the monitor 108A. The multiplexed video signals may then be sent by the first frame pod 206A to the second frame pod 206B. The second frame pod 206B may similarly extract video signals targeted to the monitor 108B, if any, and transmit the extracted signals to the monitor 108B, sending the multiplexed signals on to the third frame pod 206C, which, in turn, may extract video signals targeted to the monitor 108C, if any, and transmit the extracted signals to the monitor 108C, sending the multiplexed signals on to the fourth frame pod 206D. The fourth frame pod 206D may extract video signals targeted to the monitor 108D, if any, and transmit the extracted signals to the monitor 108D. The extraction of video signals for each monitor may be performed by a respective frame grabber in each frame pod 206, as described below with reference to FIG. 3.

It is further noted that the serial transmission of the multiplexed video signals to the respective frame pods 206 and monitors 108 may substantially reduce cabling requirements for the system, also resulting in a concomitant reduction in the number of cables which must be "pulled" through walls, ceilings, etc. in the installation of the system. Further details of this serial transmission of video signals from the computer to the succession of frame pods 206 and their respective monitors are described below with reference to FIGS. 3–13.

Figure 3:
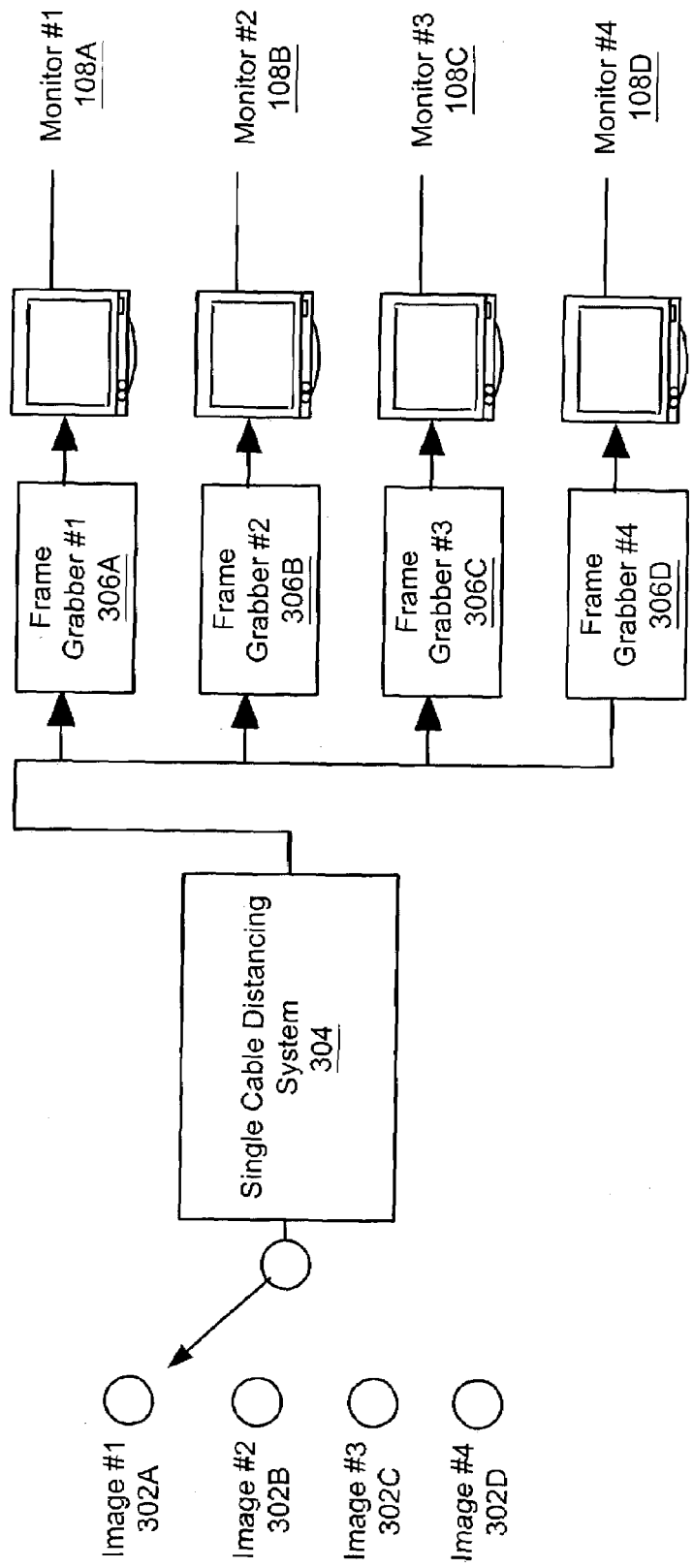
FIG. 3 illustrates the use of frame-grabbers to distribute image frames to respective monitors over a single cable, according to one embodiment.

FIG. 3—Block Diagram of the Multiple Monitor System

FIG. 3 is a block diagram showing the primary functional elements of the multiple monitor system of FIG. 2, according to one embodiment. As FIG. 3 shows, multiple images 302A–302D may be provided, e.g., by the computer 108. More specifically, FIG. 3 illustrates a series of (four) video images 302A–302D, also referred to as 'frames', sequentially selected and transmitted some distance to a series of frame grabbers (comprised in the frame pods 206 of FIG. 2) over a single cable 104. In other words, the images may be sequentially fed to multiple frame grabbers 306 and then fed to the associated monitors 108. As used herein, the term frame grabber is intended to refer to a unit configured to identify frames targeted for an associated monitor, and to forward these frames to the associated monitor, where they may then be displayed.

As FIG. 3 also shows, the system may include a single cable distancing system 304, which may be operable to extend the operational distance for a human interface, i.e., the multiple monitors and/or other human interface devices, located remotely from the computing system 102. For more information regarding the extension of operation distance from the computer to a remote human interface, please see U.S. Pat. No. 6,038,616 titled "Computer System With Remotely Located Interface Where Signals are Encoded at the Computer System, Transferred Through a 4-wire Cable, and Decoded at the Interface" issued on Mar. 14, 2000, U.S. Pat. No. 6,070,214 titled "Serially Linked Bus Bridge For Expanding Access Over A First Bus To A Second Bus" issued on May 30, 2000, U.S. patent application Ser. No. 09/619,989 titled "System and Method for Providing a Remote Universal Serial Bus" filed on Jul. 20, 2000, and U.S. patent application Ser. No. 09/680,760 titled "System and Method for Combining Computer Video and Remote Universal Serial Bus In An Extended Cable" filed on Oct. 6, 2000, all of which were incorporated by reference above.

In one embodiment, each of the images in the sequence of images or frames 302 may include a unique identifier indicating a target display, e.g., a target monitor. Each frame grabber 306 may examine the frame identifier, and when the appropriate frame grabber 306 detects an appropriate frame 302, the frame grabber 306 may grab or extract the frame from the serial signal and transmit the grabbed frame or image 302 to the corresponding monitor. Thus, each frame grabber 306 may be operable to analyze the multiplexed video signal, detect, and extract the appropriate frame 302 from the signal, and send the frame 302 to the associated monitor 108.

Figure 4:
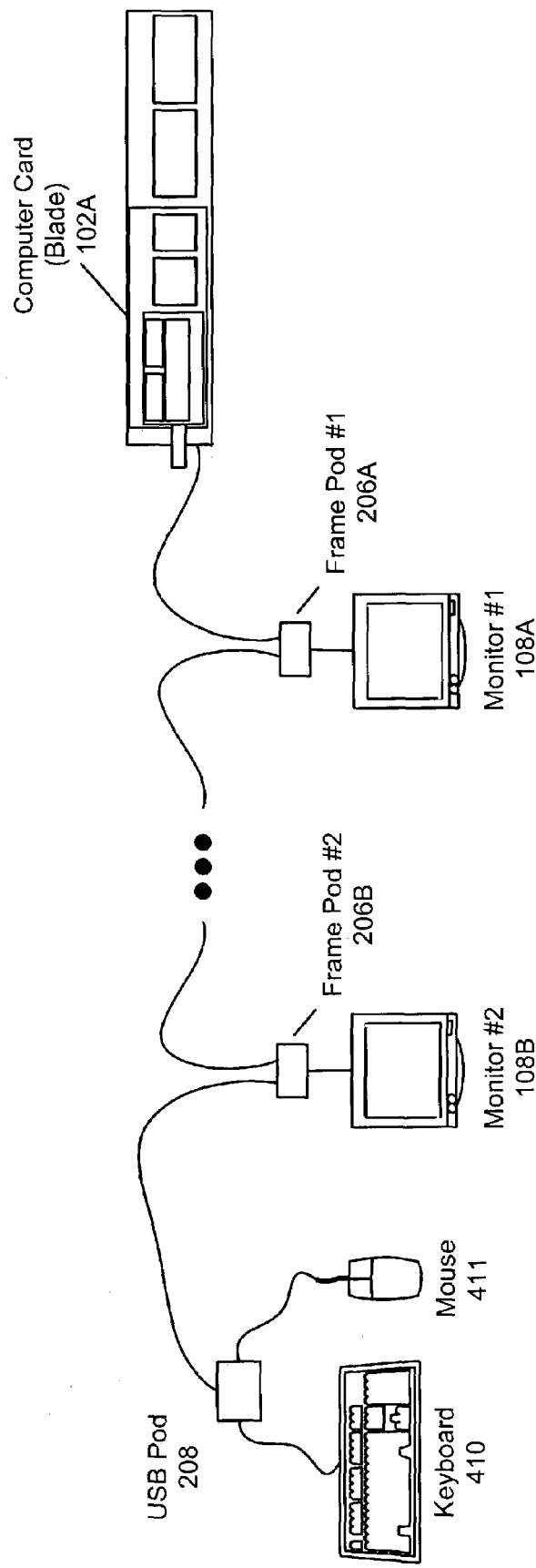
FIG. 4 illustrates an embodiment of the multi-monitor computer system in which I/O device signals are included with video signals and transmitted over a single cable.

FIG. 4—Computer Blade Based System With I/O Device Signals

FIG. 4 illustrates one embodiment of a multi-monitor system where the computer 108 comprises a "computer on a card" or "blade computer" 102A. As shown in FIG. 4, the blade computer 102A may serially couple to a series of frame pods 206, as described above. As also described above, each of the frame pods 206 may couple to a respective computer monitor 108. As is commonly known in the art, the blade computer 102A includes most or all of the functional components of a computer, e.g., processor, memory, power supply, etc., packaged with a blade or drawer form factor, such that multiple computers (blades) 102A may be co-located, e.g., in a rack or cage, thereby significantly reducing the space requirements for the computers. For more information on blade computers and co-located computer systems, please see U.S. patent application Ser. No. 09/728,667 titled "Computer On A Card With A Remote Human Interface" filed on Dec. 1, 2000, and U.S. patent application Ser. No. 09/728,669 titled "A System Of Co-Located Computers In a Framework Including Removable Function Modules for Adding Modular Functionality" filed on Dec. 1, 2000, which were incorporated by reference above. It should be noted that the use of a blade computer as the computer 102 is meant as an example only, and is not intended to limit the type of computer 102 used in the system to any particular type or form.

In this embodiment, a software driver executing in the blade computer 102A may map images out of memory as sequential frames (302A–302D). The frame pods 206, i.e., the frame grabbers 306A–306D, may each be operable to select or pick off an assigned frame of video and play it back to the respective monitor 108 at full refresh rate. It is noted that in one embodiment, the number of unique monitors supported in the system may be a function of video chip memory and a specified lowest acceptable rewrite rate, discussed in more detail below. Again, it is noted that the number of monitors/frames described herein is exemplary only, and is not intended to limit the number of monitors or frames to any particular value. Additionally, it is noted that in some embodiments of the system, the number of frames and the number of monitors may differ. For example, in an airport terminal application of the system, various monitors may display the same information. Thus, in a simple example, three images may be distributed over nine monitors, where the first two images may each be displayed on four monitors, and the third image may be displayed on the ninth monitor. This type of flexibility is provided by the ability of each frame pod 206 to examine the combined or multiplexed video signal and extract any video frame based on the frame identifier.

As FIG. 4 also shows, the final frame pod in the series, in this example, frame pod 206B, may couple to a USB (universal serial bus) pod 208. The USB pod 208 may couple to one or more I/O devices, also referred to as human interface devices, e.g., keyboard 410, mouse 411, included in the computer system's HI. The USB pod may thus terminate the line and process signals for all the HI devices. The USB pod may also be operable to receive user input from the HI devices and transmit the HI device signals through the cable 104 (and all of the frame pods 206) back to the computer 102A.

Figure 5A:
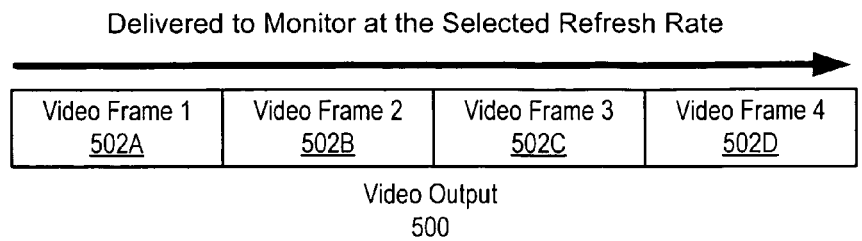
FIGS. 5A–5C illustrate video frame management in the multi-monitor system, according to one embodiment.
Figure 5B:
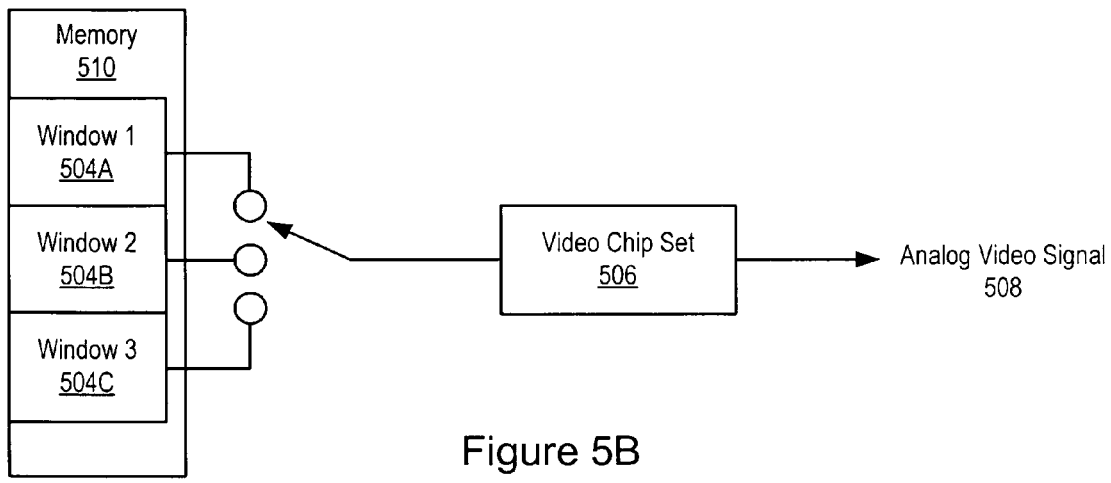
Figure 5C:
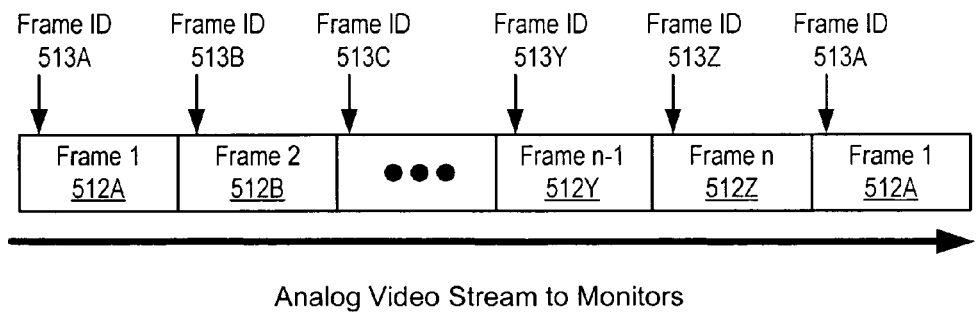

FIGS. 5A–5C—Video Frame Management

FIGS. 5A–5C illustrate video frame management in a computer system, according to one embodiment. FIG. 5A shows a sequence of video frames delivered to the monitor at a selected refresh rate. In a typical computer video display system the CPU will map instructions to build a video image out of memory and into a video processor, e.g., a graphics card. The video processor may take these digital instructions from memory and create, along with proper synchronization information, a video image which may be output as a sequential series of image lines whose aggregation constitutes the video 'frame'1 502A, i.e., one complete screen or "Window" of video information. This process may continue unabated at a rate typically between 60 and 85 frames per second. This signaling is repetitious, in that the same block of video data is output for a single monitor installation. This block of video data is typically rewritten by the computer 102 as needed to keep the screen's or window's contents current. Several 'screens' may reside in the computer's memory and may be written over each other as selected from the active windows screen by either keystrokes or mouse clicks. ≠1 For the sake of this RFQ it is assumed that the reader is fully familiar with the VESA defined VGA, SVGA, XVGA, and etc. video signaling protocols employed in contemporary Personal Computer Video Technology.

In a typical computer application the multiple window capabilities, e.g., of Microsoft Windows 2000 or XP are supported by a section of memory assigned to hold the data constituting the windows. FIG. 5B illustrates a simplified version of the process. As FIG. 5B shows, multiple windows 504A–504C, i.e., video images, may be stored in computer memory 510, each with a start and stop location in the memory address space. These data are typically selected by the video driver to be rendered to through the video card out to the monitor in a standard VESA protocol (component color video plus synchronization data signals). This process is essentially the selection of the start and stop memory locations for the window of choice. Thus, in response to user input, such as a mouse click activating or selecting a window as the active window, the video card may select one of the windows, i.e., memory locations, for display, as shown in FIG. 5B. The data at the selected memory location, i.e., the selected window 504A, may then be converted by the video card 506 to an analog video signal 508, as shown.

In one embodiment of the present invention, the stream of frames shown in FIG. 5A may be modified such that each frame may be displayed on a different monitor. In other words, the video driver/processor may be altered such that switching between windows 504 may be performed automatically on a frame basis. In other words, for a three-monitor example, the video processor 506 may first select and render a first frame, comprising the data of window #1 504A. With the completion of the rendering of a frame of Window #1, the 'switch' may be advanced to the memory for Window #2 and that frame rendered. Finally, the process may select the Window #3 and render its frame, after which the process returns to Window #1. This process may be extended to support Window #1 to Window #'n', where the value 'n' may be determined and stored in the system during setup or initialization, or may be modified later, and remembered by the computer until changed.

FIG. 5C illustrates an example video output stream for an "n-window" system. The n frames 512A–512Z may be transmitted sequentially as shown, where the sequence cycles back to frame 1 512A once all of the frames have been transmitted. As FIG. 5C shows, frames 1 512A through frame n 512Z may each have an associated frame ID 513A–513Z. These IDs may be used to identify and select each frame from the combined or multiplexed video stream, as mentioned above. In one embodiment, each frame grabber 306 may have an ID which may be matched to the frame ID to indicate that the frame grabber 306 is to extract the frame for display on the respective monitor 108. An example of the placement of this frame ID 513 is described below with reference to FIG. 6.

Figure 6:
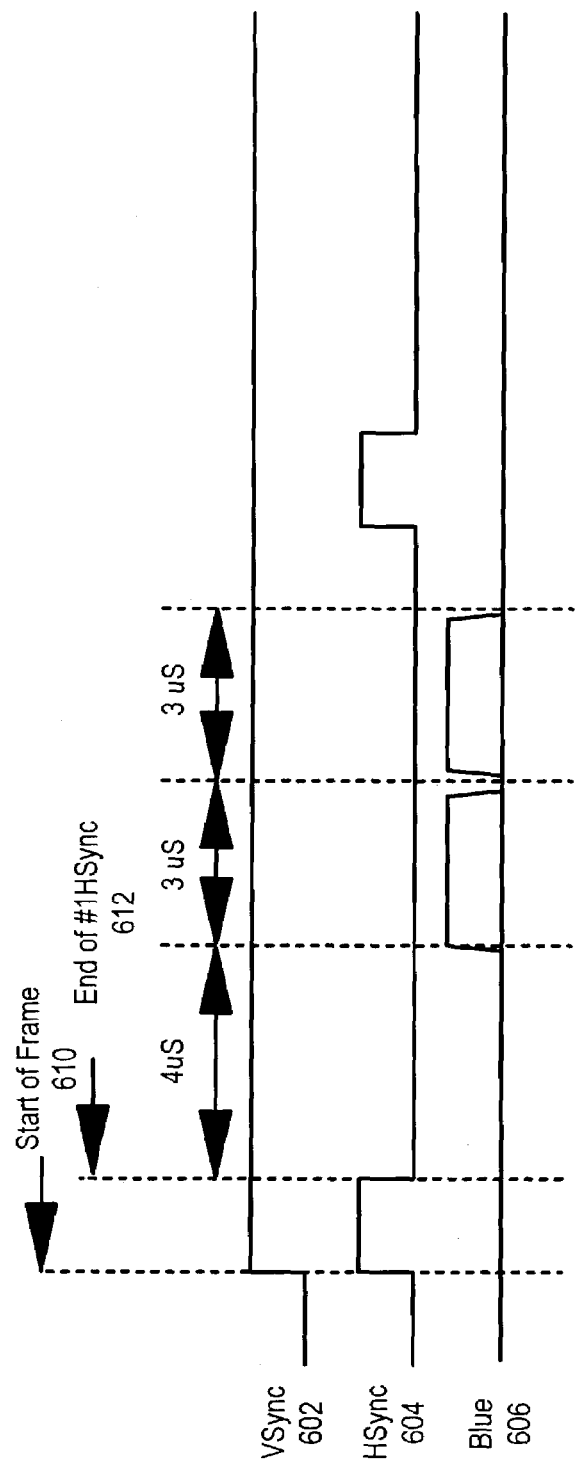
FIG. 6 illustrates frame timing, according to one embodiment.

FIG. 6—Encoding Format For Frame ID

FIG. 6 illustrates frame timing, according to one embodiment, and more specifically, FIG. 6 illustrates one embodiment of a format for encoding the frame IDs mentioned above with reference to FIG. 5C. As FIG. 6 shows, for each rendered frame, a simple frame identifier may be inserted to tag the frame. In this example embodiment, the frame ID may be located in the first line of the 'blue' video stream 606. In an embodiment where four different frames and/or displays are supported, the frame ID may comprise 2 bits, 3 microsecond long, starting 4 microseconds after the end 612 of the first Hsync 604 that occurs during Vsync 602. Frame #1 may be coded as '00', frame #2 as '01' frame #3 as '10', and frame #4 as '11'.

It is clear that in such a system the rate of refresh of the video driver may be independent of the refresh rate of the individual monitors. That is the video output of the computer can operate at the lowest rate possible in an effort to reduce the bandwidth of the signal being transferred down the cable connecting the computer and the monitors. The monitors can operate at their highest refresh rate for the user's satisfaction and viewing ease. Clearly a large number of monitors would significantly slow the actual frame data transfer rate and may produce a 'jumpy' image on the monitor when used with rapidly changing video data, i.e., 'action video'. It is anticipated that for normal 'business' graphics and video this may not be of consequence. A further possible consequence of the distribution of the frame rate across multiple monitors is "mouse jump", in which the cursor or mouse may appear to be 'sticky', remaining in one location for a period, then suddenly jumping to another location, skipping the mouse positions in between. This issue is addressed below with reference to FIG. 7.

Figure 7:
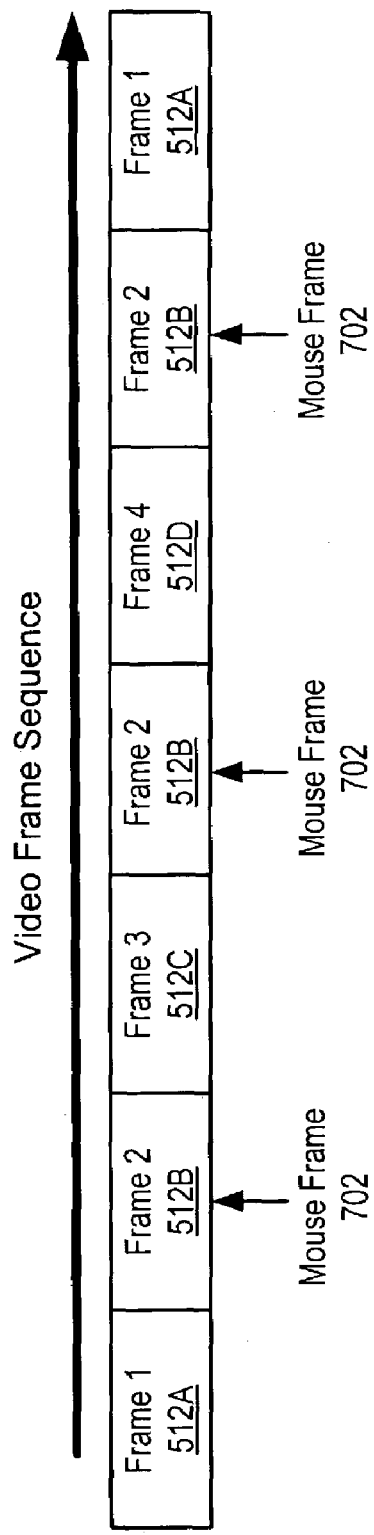
FIG. 7 illustrates video frame sequencing, according to one embodiment.

FIG. 7—Video Frame Sequencing

FIG. 7 illustrates video frame sequencing, according to one embodiment. More specifically, FIG. 7 illustrates a video frame sequencing scheme which addresses the "sticky mouse" issue mentioned above. In this embodiment, the frame 702 containing the mouse/cursor information may be sent on an every-other-frame basis to eliminate the jerkiness of the mouse that would result from a too infrequent refresh. Such an output is illustrated in FIG. 7 for a 4 screen (frame) implementation with frame #2702 having the mouse in it. Thus, the frame sequence is frame 1 512A, frame 2 512B, frame 3 512C, frame 2 512B, frame 4 512D, frame 2 512B, frame 1 512A, and so on, as FIG. 7 indicates, wherein frame 2 512B is the mouse frame 702.

Figure 8:
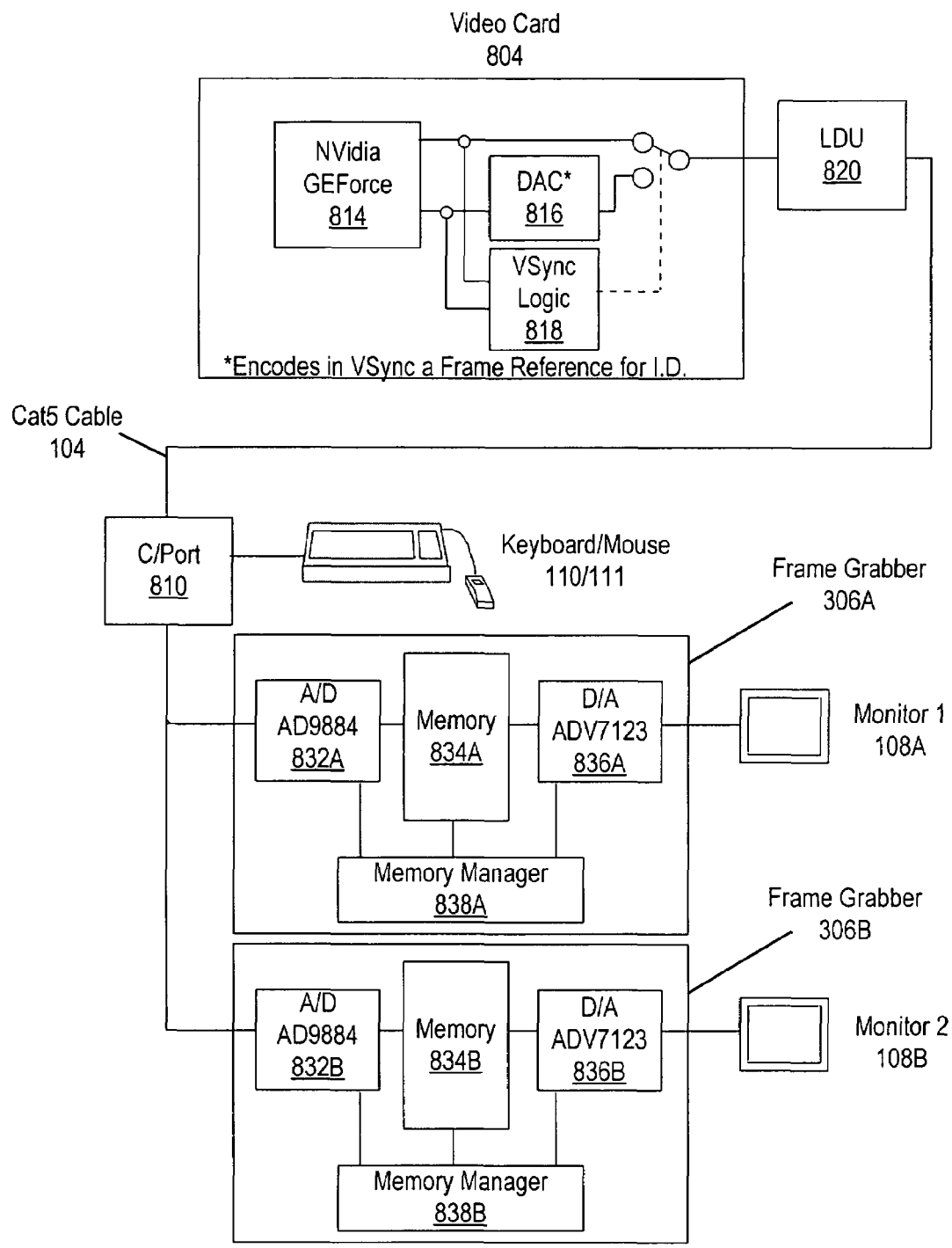
FIG. 8 is a block diagram of a dual monitor drive system based on a high-performance video card, such as the NVIDIA GEFORCE™ video chip, according to one embodiment.

Further information regarding this approach to video frame sequencing are described below with reference to FIGS. 14 and 15. FIG. 8 Block Diagram of a Dual Monitor System Based On A High-Performance Video Chip, Such As The NVIDIA GEFORCE™ Video Chip The video Window data stream described above can be produced in at least three ways. The first is pure software, that is, the video processor driver software may be altered so that the video processor fully manufactures the data stream. A second approach is to perform the process in hardware. For example, several independent video processors may be used to create the images and to multiplex the signals for the images into a single line. FIG. 8 is a block diagram of this second approach, as applied to a high-performance video chip, such as an NVIDIA GEFORCE™ Video Chip, according to one embodiment. It is noted that the use of the NVIDIA GEFORCE™ Video Chip is exemplary only, and is not intended to limit the video card or chipset used in the invention to any particular type. The third method is a combination of the two, that is most of the frame is created by the software and the video processor, the additional information (including but not limited to the frame ID) may be added by additional hardware.

As FIG. 8 shows, in this example, the system is a dual monitor drive system based on a high-performance video chip, such as the NVIDIA GEFORCE™ video chip. This device 804 has two independent outputs, analog and digital, managed by existing high-performance graphics card software, e.g., existing NVIDIA™ software. The system may multiplex frames from these two outputs down a single cable 104, e.g., a Category 5 cable, to be captured by a pair of frame stores (grabbers) 306A and 306B and distributed to respective monitors 108A and 108B, as illustrated.

More specifically, the high-performance graphics card, e.g., the NVIDIA™ based video card 804, has two outputs, output #1, which is a digital signal converted to analog via an on-card DAC 816, and output #2, which is analog. Based on the VSync, the output of the card 804 may be multiplexed between the two outputs on a frame-by-frame basis, e.g., via VSync Logic 818, as shown. This output may be based on an alternating presentation of the frames, e.g., a frame from output #1, then a frame from output #2, then a frame from output #1, and on. It is understood that this may cause some discontinuity in the signal output, that is frame #2 may not be ready for transmittal at the end of frame #1. As FIG. 8 also indicates, in the embodiment shown, the multiplexed output may be received by LDU 820 and transmitted over Cat5 cable 104 to C/Port 810, which may be coupled to frame grabbers 306A and 306B, as well as keyboard 110 and mouse 111. Note that in this example, each frame grabber 306 includes a respective analog/digital converter 832, e.g., an AD9884 A/D converter, referred to respectively as 832A and 832B, which may operate to receive video frames from the C/Port 810, and convert the analog frames to digital equivalents. As shown, each A/D converter (832A and 832B) may couple to a respective memory (memories 834A and 834B) and a respective memory manager (memory managers 838A and 838B), which may also couple to the memories 834A and 834B, respectively. As also shown, the respective memories 834A and 834B and the respective memory managers 838A and 838B may also couple respectively to a corresponding digital/analog converter 836, e.g., an ADV7123 D/A converter, referred to respectively as 836A and 836B, which may be operable to convert digital video frame information to analog and send to respective monitors, e.g., monitor 1 108A and monitor 2 108B, for display.

Figure 9:
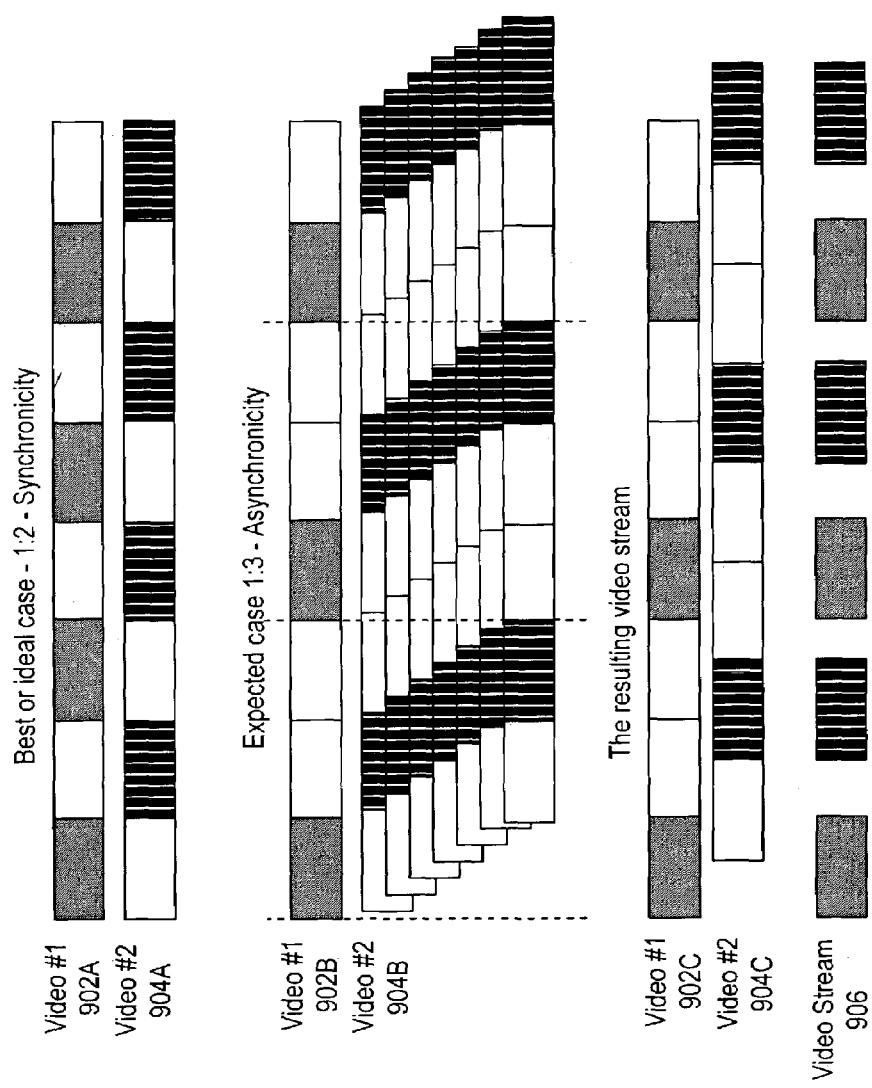
FIG. 9 illustrates a video multiplexing scheme for the dual monitor system of FIG. 8, according to one embodiment.

FIG. 9—Video Multiplexing Scheme for the Dual Monitor System of FIG. 8

In the embodiment of FIG. 8, the high-performance graphics chip. e.g., the NVIDIA™, chip has asynchronous outputs, in that the two channels are generated from independent clocks such that when both channels are refreshing at the same rate the actual V and H Sync signals have slightly different periods or frequencies, e.g., 5 to 10 Hz difference, which is the result of independent sources. This feature allows each output to operate at a different refresh rate without complex internal calculations or frequency synthesis.

FIG. 9 illustrates a video multiplexing scheme for the dual monitor system of FIG. 8, according to one embodiment. The basic multiplexing scheme is to send every other frame down the line. In practice, there may be a gap between the frames of up to just less than two whole frames, thus, in a worst case scenario, the system may capture what is effectively every third frame rather than every other frame, as FIG. 9 indicates.

At the top of FIG. 9, a best or ideal case is illustrated, where a first video output 902A and a second video output 904A are shown with equal period or frequency. Thus, in the ideal case, the two video frame sequences may be multiplexed together seamlessly, with no frame losses or asynchronicities. In contrast, in the expected case, the frequencies of video #1 902B and video #2 904B may differ such that every third frame of each video stream is selected and multiplexed for transmission to the monitors, as shown by the video streams 902C and 904C, resulting in the video stream output 906. Therefore, at 75 Hz refresh one may expect to see about 27 rewrites per second. This will probably not be noticeable when moving the mouse, although there will likely still be gaps in the video stream. As mentioned above, it is expected that for most applications, e.g., business applications, the slightly slower data presentation rate will be acceptable.

Figure 10:
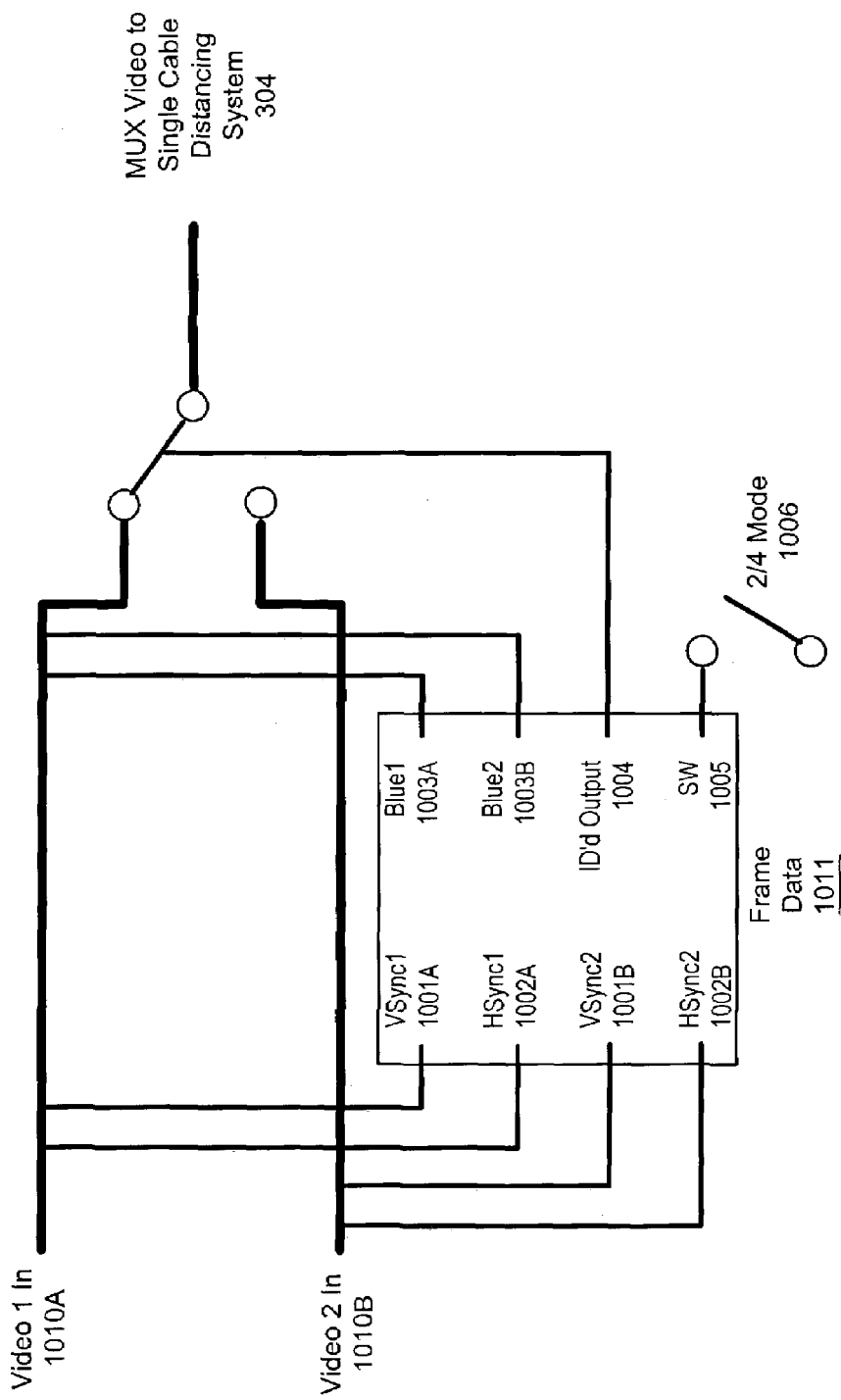
FIG. 10 illustrates a video encoding scheme for the dual monitor system of FIG. 8, according to one embodiment.

FIG. 10—Video Encoding Scheme for the Dual Monitor System of FIG. 8

FIG. 10 illustrates a video encoding scheme for the dual monitor system of FIG. 8, according to one embodiment. As FIG. 10 shows, frames from video input 1 1010A and video input 2 1010B may be multiplexed based on information included in the frame. Such frame data 1011 may include Vsync1 1001A, Hsync1 1002A, Vsync2 1001B, and Hsync1 1002B, as well as Blue1 1003A, Blue2 1003B, an identified output 1004, and a switch signal slot 1005. The particular data stored in each frame may occupy respective time slots in the transmitted frame signal.

In this process the vertical and horizontal synchronization signals for the two video streams, Vsync1 1001A, Hsync1 1002A, Vsync2 1001B, and Hsync1 1002B, are the operative stimulants for the system, controlling the sequencing of the two input video frame streams 1010A and 1010B. The lines to the blue signals, Blue1 1003A and Blue2 1003B may transition from a tri-stage or high impedance state to that of high (1 Volt) to indicate the presence of data. The time slot marked 'ID'd Output' 1004 may differentiate the two videos for a given board. The time slot marked 'SW' may be used when 4 such frame grabbers are used and 4 video signals are present on the line, as indicated by the 2/4 mode switch 1006. One example of process flow for the multiplexing process is described below with reference to FIG. 11.

Figure 11:
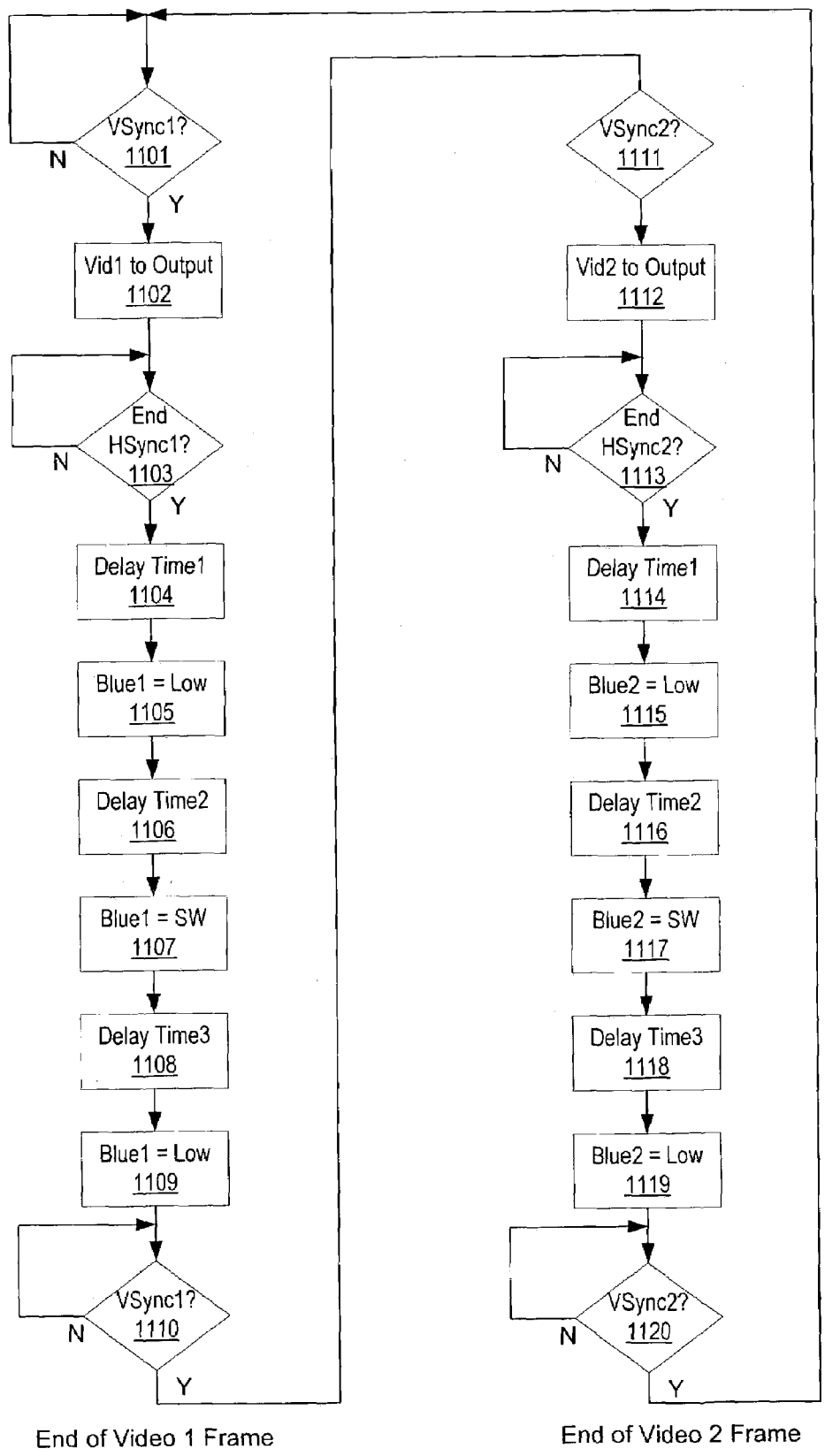
FIG. 11 is a flowchart of a method for generating video signals in a dual monitor system, according to one embodiment.

FIG. 11—Flowchart for Generating Video Signals in a Dual Monitoring System

FIG. 11 is a flowchart of a method for generating video signals in the dual monitor system described above with reference to FIGS. 8–10, according to one embodiment. As FIG. 11 shows, the same basic steps are performed for a frame from each video stream. In this example, a frame from video stream 1 1010A is processed first, then the equivalent steps performed for a frame from video stream 2 1010B.

In 1101, the presence of the VSync1 1001A is tested. In other words, the method determines if the vertical sync signal for the first video stream 1010A is present. If the VSync1 1001A is not present, the method step repeats, as shown, until the VSync1 signal is detected.

Once the VSync 1 1001A is detected, then in 1102, the signal of the first video stream 1010A may be output, as indicated. Then, as 1103 shows, the method may repeatedly check for the end of the Hsync1 signal 1002A, i.e., the end of the horizontal sync signal for the first video stream 101A. When the end of the Hsync1 1002A is detected, then in 1104 a delay time1 may be inserted into the stream, and in 1105, the blue1 signal line set to low, as shown.

Then, in 1106, a delay time2 may be inserted into the stream, and the blue1 signal line set to SW, as shown in 1107. A delay time3 may then be inserted into the stream, as indicated in 1108, and the blue1 signal line set to low again, 1109 shows. The method may then check for the presence of the VSync1 signal, as 1110 shows. Once the VSync1 signal is detected, the video 1 frame is complete.

Once the video 1 frame has been completed, then the above steps are effectively repeated, but with frame data from video 2 1010B. Thus, in 1111, the presence of the VSync2 1001B is tested, and if the VSync2 1001B is not present, the method step repeats until the VSync2 signal is detected.

Once the VSync2 1001 B is detected, then in 1112, the signal of the second video stream 1010B may be output, as indicated. Then, the method may repeatedly check for the end of the Hsync2 signal 1002B, i.e., the end of the horizontal sync signal for the second video stream 1011B, as 1113 shows,. When the end of the Hsync2 1002B is detected, then in 1114 a delay time1 may be inserted into the stream, and in 1115, the blue2 signal line set to low, as shown.

Then, in 1116, a delay time2 may be inserted into the stream, and the blue2 signal line set to SW, as shown in 1117. A delay time3 may then be inserted into the stream, as indicated in 1118, and the blue2 signal line set to low again, 1119 shows. The method may then check for the presence of the VSync2 signal 1000B, as 1120 shows. Once the VSync2 signal is detected, the video 2 frame is complete.

Thus, in one embodiment, the method may receive two video frame streams and multiplex the streams together on a frame by frame basis, based on information included in the frame data. Thus, each frame grabber may implement a method of saving a frame or window and then replaying it to the respective monitor. A more detailed block diagram of a frame grabber 306 is shown in FIG. 12, described below.

Figure 12:
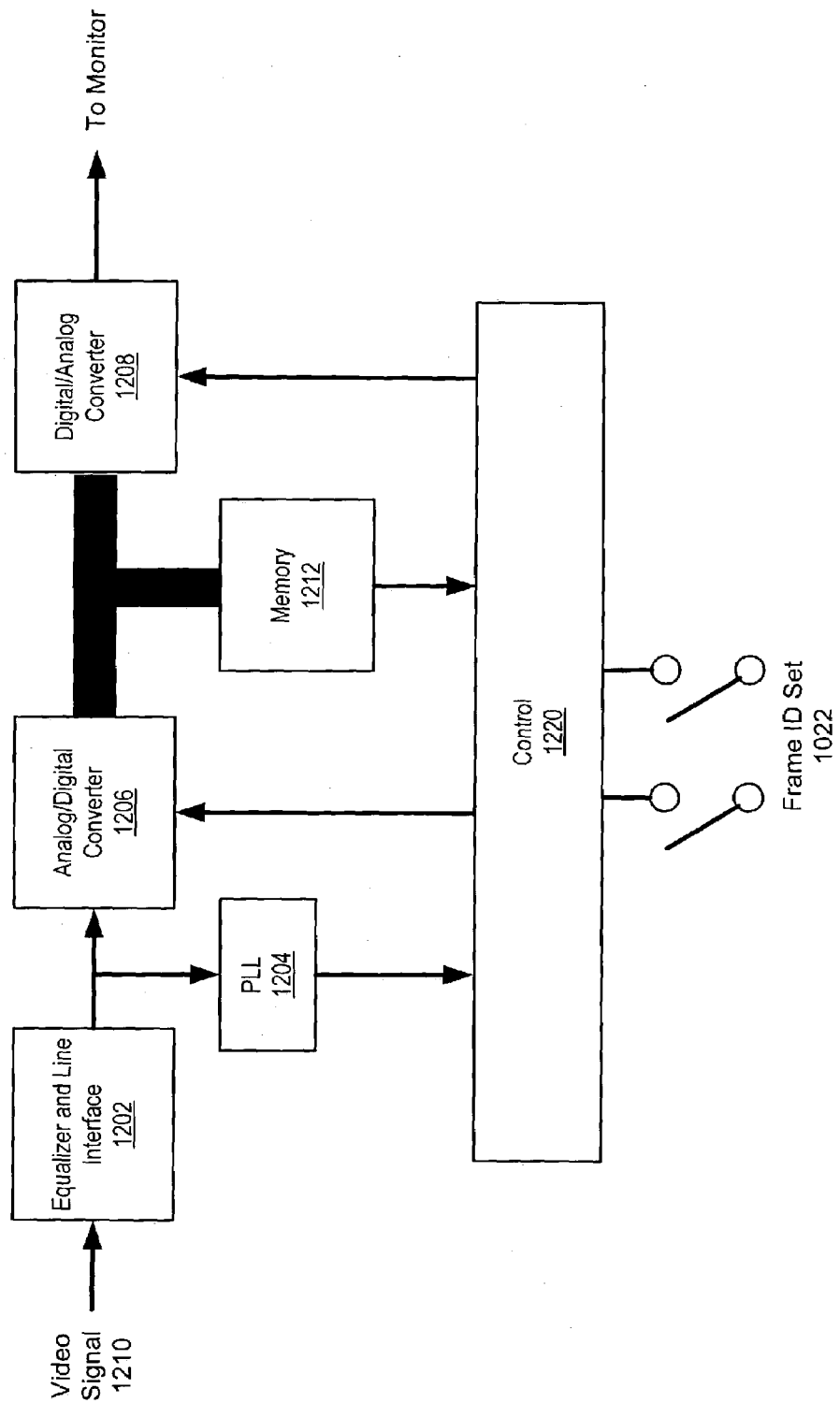
FIG. 12 illustrates a process for receiving and distributing video frames in a multi-monitor system, according to one embodiment.

FIG. 12—Frame Grabber

FIG. 12 illustrates a process for receiving and distributing video frames in a multi-monitor system, according to one embodiment. In this process the video signal is fed to all the frame grabbers 306, which then perform the extraction of the appropriate frame for sending to a respective monitor. As FIG. 12 shows, a video signal 1210 may be received by an equalizer and line interface 1202. The video signal may be interfaced and equalized to compensate for cable issues of time and frequency.

The video signal 1210 may then be split and sent to a Phase Locked Loop (PLL) element 1204 and an analog/digital converter 1206, as shown. In one embodiment, the basic pixel clock rate may be extracted by the PLL to operate as the local clock. The image may be converted from analog to digital by the analog/digital converter 1206, and fed to the memory 1212. As FIG. 12 also shows, the control module may access the frame data, examining the first line of each frame for its ID code. In one embodiment, all first lines may be the same, and so may simply be written over in the memory. If the frame ID is the same as the frame grabber ID then the rest of the video image may be saved.

Once the video image is saved, the video image or frame may be sent to a digital/analog converter 1208 which converts the digital frame to an analog signal. The control module 1220 may then send the resulting signal to the associated monitor 108.

Figure 13:
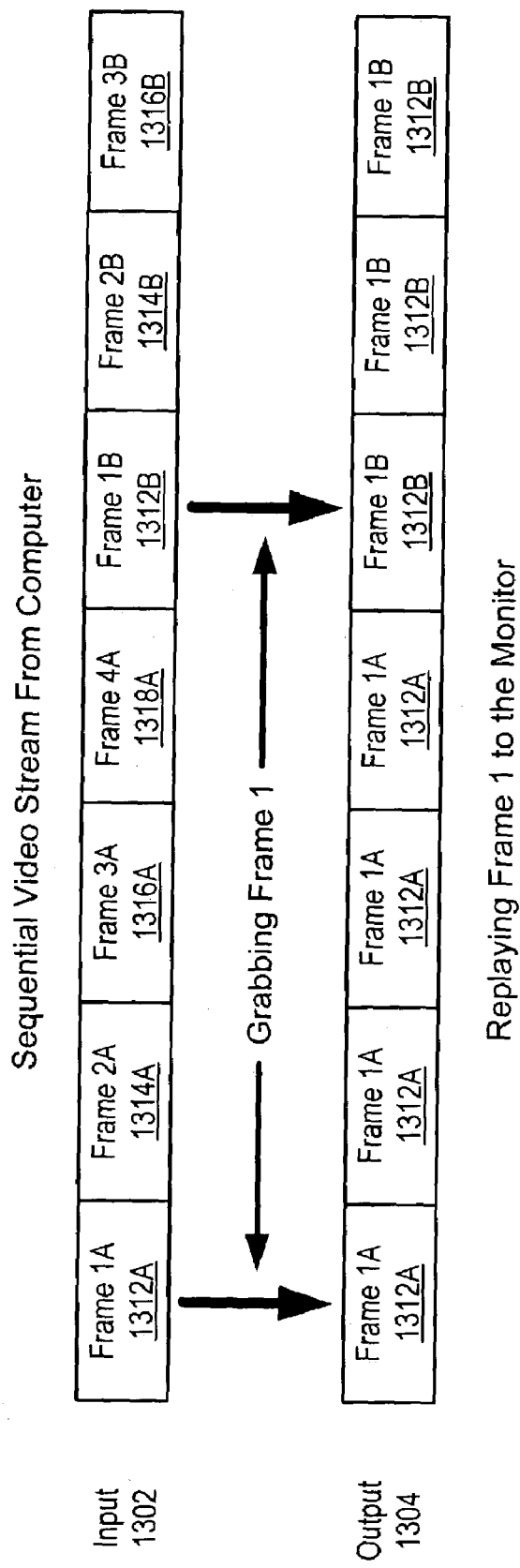
FIG. 13 illustrates the relationship between the framegrabber's input and output, according to one embodiment.

FIG. 13—Frame Grabber Input and Output

FIG. 13 illustrates the relationship between the first frame-grabber's input 1302 and output 1304, according to one embodiment. As FIG. 13 shows, a sequential video stream 1302 may be received from the computer 102. In this example, the video sequence comprises frame 1A 1312A, frame 2A 1314A, frame 3A 1316A, and frame 4A 1318A, followed by frame 1l B 1312B, frame 2B 1314B, frame 3B 1316B, and so on. In other words, video frames from 4 inputs are multiplexed together. Once the frames for a given cycle, e.g., 'A', for the inputs are input, then frames for the next cycle, e.g., 'B', are input.

As FIG. 13 shows, the frame grabber 306A identifies and 'grabs' frame 1A 1312A, based on the frame's ID (by matching it with the frame grabber's ID). The frame grabber 306A may then send the grabbed frame 1A 1312A repeatedly to the monitor 108A, as shown in the first four frames of the output stream 1304. Then, once the frame grabber 306A detects the next frame from the first video source, i.e., frame 1B 1312B, the frame is extracted and sent to the monitor 108A, as shown. In one embodiment, the output frames may be sent to the monitor 108A at the monitor's refresh rate. Thus, the rates of the input and the output may differ, e.g., the frame grabber 306A may receive frames at a first rate, e.g., 60 Hz, while sending the output frames to the monitor 108A at a different rate, e.g., 75 Hz.

Thus, various embodiments of the systems and methods described herein may provide means for driving multiple monitors with a single computer, where multiplexed video frames may be transmitted over a single serial cable, and extracted sequentially by frame grabbers associated with respective monitors. Some of the points of novelty of various embodiments discussed herein include, but are not limited to, the following:

1. The video data stream is a sequence of complete image frames or windows;
2. A unique frame identification is attached to each frame;
3. Frames are totally independent of each other and are fully unique and complete images;
4. Frames need not be contiguous or continuous;
5. Frames are refreshed to the monitor independent of the how often they are rewritten to the frame grabber;
6. The frame grabber is an independent and complete frame reception node;
7. The system is scaleable from 2 to N nodes; and
8. The image (window) that contains the human interaction devices (typically the visually critical items such as the mouse) are rewritten more often to reduce the apparent 'jerkiness' of their perceived movement.

FIG. 14—Video Frame Sequencing with Selective Updating

FIG. 14 illustrates video frame sequencing for a plurality of display devices with and without selective updating, according to one embodiment. More specifically, FIG. 14 elaborates on an approach mentioned above with reference to FIG. 7, although it is noted that the embodiments of FIG.

7 and FIG. 14 are exemplary only, and are not intended to limit the invention to any particular updating or sequencing scheme. It should also be noted that the term "display device" may refer to any type of display device which operates to display image data, such as from a computer. For example, display devices contemplated include cathode ray tube (CRT) monitors, liquid crystal display (LCD) monitors, plasma displays, virtual reality (VR) headsets, glasses, or eye-pieces, and projection displays, among others.

As FIG. 14 shows, a first video frame sequence is shown where each of the display devices is updated at the same rate. In the embodiment shown, each frame is labeled with a simple frame identifier designating a respective display device. In other words, each frame indicates its target display device, where the indicated display device operates to display the respective frame. Note that the frame identifiers shown are simplified, and that other types of frame identifiers are also contemplated. It is also noted that associations or assignments between the frame identifiers and the respective display devices may be modified, e.g., by a user of the display devices, by a system administrator, by software executing on a computer system coupled to the display devices, etc. Thus, in the embodiment of FIG. 14, the frames may be variously targeted for display on any of four display devices.

As FIG. 14 also shows, in this example, Frame 2 512B is designated as an active frame 1402. As used herein, the term "active frame" refers to a video frame that is associated with a display device that has, or is associated with, a higher activity level relative to the other display devices in a multiple display device system, where the activity level is determined based on specified (possibly user-defined) criteria. For example, in the embodiment of FIG. 7, the active frame refers to the frame that includes the cursor (e.g., the "mouse"). Metrics for determining the active frame may include, but are not limited to, user activity, e.g., user-driven peripheral activity, such as mouse movement, keyboard entry, touch screen events, user's viewing direction, i.e., whether the user is currently viewing a particular display, etc.; graphics activity, e.g., the amount or rate of change in image data; and application activity, e.g., which display device or frame is associated with an active application, e.g., a word processor program or media player, among others.

Note that in the example shown, because each of the display devices is updated at the same rate, and the frames for four display devices are multiplexed together, the effective update rate for each frame is roughly one fourth what the rate would be with only one display device, i.e., with no multiplexing. Thus, in this process the actual update rate of the data is considerably slower than the refresh rate of the image to the associated display device. In the example where the active frame 1402 is the cursor frame, the cursor location on the corresponding display device responds at a slower rate due to the fact that the image data is updated less frequently. More specifically, the cursor location is updated at roughly one fourth the normal rate (the rate without multiplexing). Thus, the update rate of the active frame 1402 may result in substantially decreased performance as perceived by the user, e.g., sluggish response to user activity, jerky video, etc.

In the second video frame sequence shown in FIG. 14, the active frame 1402 (Frame 2 512B) is selectively updated more frequently than the other frames in the sequence, i.e., Frame 1 512A, Frame 3 512C, and Frame 4 512D. More specifically, the active frame 1402 is inserted or interleaved between each of the other frames in the sequence, as shown. Thus, in this example, rather than being updated at one fourth the normal rate, the active frame 1402 may be updated at one half the normal rate, thereby effectively doubling the performance or responsiveness of data associated with the corresponding display device from the user's perspective. For example, in the case where the active frame is the cursor frame, the responsiveness of the mouse or other pointing device may be roughly doubled as compared to the first frame sequence.

In one embodiment, the selective frame sequencing may only be performed a portion of the time. For example, in one embodiment, the selective frame sequencing may be performed when the cursor, e.g., the mouse, is moving, e.g., when the user is interacting with the image or display device in some way. As another example, selective frame sequencing may only be performed when changes in image data for one of the display devices exceeds some specified threshold. In other words, depending upon the criteria that define "active frame", there may be periods when there is no current active frame, in which case, no special sequencing may occur.

Further details of selective frame sequencing are provided below with reference to FIGS. 15A and 15B FIGS. 15A and 15B—Methods for Selective Frame Sequencing FIGS. 15A and 15B flowchart respective embodiments of a method for selectively sequencing video image frames in a multiple display device system. It should be noted that in various embodiments, some of the steps described may be performed concurrently, in a different order than shown, or omitted. Additional steps may also be performed as desired.

Figure 15A:
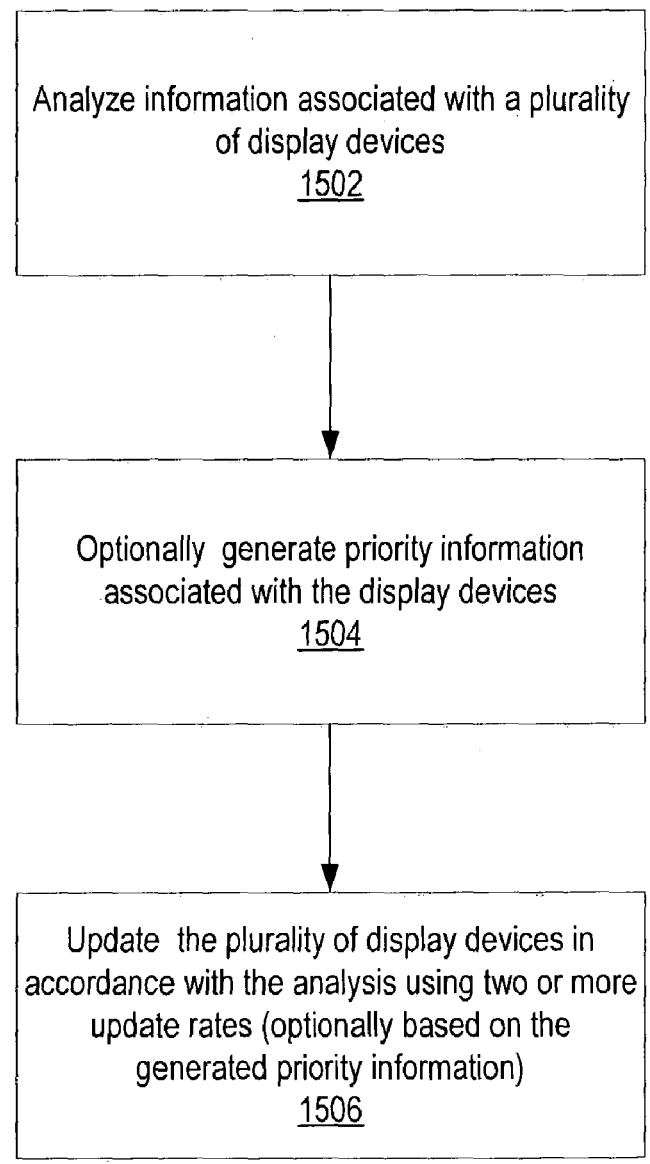
FIG. 15A flowcharts one embodiment of a method for selectively updating a display in a multi-display system.

FIG. 15A is a high level flowchart of one embodiment of a method for selectively updating image data for a plurality of display devices coupled to a computer. As noted above, the display devices may be any type of display device that operates to receive image data from a computer and displays the image data.

As FIG. 15A shows, in 1502, information associated with a plurality of display devices, e.g., computer monitors, may be analyzed. For example, in one embodiment, analyzing information associated with the display devices may include determining respective levels of user activity associated with each display device, e.g., determining respective levels of peripheral activity associated with each display device, such as, for example, mouse movement, keyboard entry, head-tracking activity, touch-screen events, user's viewing direction, i.e., whether the user is currently viewing a particular display, etc.

In another embodiment, the analyzing may include determining respective levels of graphics activity associated with each display device, such as determining respective rates of change in image data associated with each display device. For example, if a first of the display devices were displaying a movie, while the others displayed documents, spreadsheets, or other relatively static images, the first display device may have a higher graphics activity than the others.

In yet another embodiment, the analyzing may include determining respective levels of application activity associated with each display device. For example, a determination may be made as to which display device is displaying or is associated with an active application, e.g., the current active window. Of course, in other embodiments, various combinations of these types of determinations may be made, where associated metrics may be computed and/or combined, e.g., using weighted normalized sums, fuzzy logic, etc., to determine relative activity associated with each display device.

In one embodiment, priority information associated with the display devices may optionally be generated based on the analyzing of 1502, as indicated in 1504. For example, a respective metric for each display device may be computed indicating a degree to which a user's attention is directed to the display device. As noted above, in one embodiment, a variety of metrics may be determined for each device, then combined into a single metric, e.g., using weighted sums or fuzzy logic. The priority information may then be used to rank the display devices and/or to determine relative update rates, as described below.

Finally, in 1506, the plurality of display devices may be updated in accordance with the analyzing, and optionally, based on the priority information, where the plurality of display devices are updated using two or more update rates.

For example, in an embodiment where generating priority information includes computing a respective metric for each display device indicating a degree of activity associated with the display device, updating the plurality of display devices based on the priority information may include updating image data displayed on each of said plurality of display devices at an update rate corresponding to said respective metric. In other words, image data for the respective display devices may be updated at different rates, depending upon the analysis of activity associated with the display. It is noted that an important distinction should be made between the update rate and the refresh rate for a display device. As described above with reference to FIG. 13, a particular frame may be presented repeatedly without update to a display device, e.g., a monitor, at the monitor's hardware refresh rate, typically between 60 MHz and 75 MHz. Said another way, the update rate for a display device is typically much slower than its hardware refresh rate, e.g., an update rate may be on the order of 30 frames per second, as opposed to the megahertz ranges of display device hardware refresh rates. In a preferred embodiment, the analyzing and updating is performed in an iterative manner. In other words, the metrics determining if and how to perform the selective updating may be computed repeatedly, and thus, the respective update rates for the plurality of display devices may change over time.

It should be noted that the method described above is preferably performed in an iterative manner, where the analysis and selective updating are executed periodically, e.g., at a nominal frame rate, to monitor and adjust the video display process for a substantially improved user experience.

In another embodiment, a plurality of display devices used by a user, including a first display and a second display, may be updated in the following manner:

First, a determination may be made as to whether the user is currently viewing the first display or the second display. The first display may be updated according to a first update rate, and the second display updated according to a second update rate, where the first update rate and the second update rate are determined based on the determination. In other words, the display the user is currently viewing may be updated at the first rate, while the second display (and/or any other displays) may be updated at the second rate, where the first rate is preferably faster than the second rate.

In various embodiments, determining whether the user is currently viewing the first display or the second display may include analyzing information associated with the plurality of display devices, analyzing user input from a user input device, e.g., a head or eye tracking device, and/or receiving information from a software program, among other ways of determining.

As described in detail above with reference to FIGS. 4–13, in one embodiment, updating the plurality of display devices may include generating a sequence of video frames based on the analysis, where each video frame includes a video image and a frame identifier (see FIG. 5C), and where each of the video images is stored in a video processor in a computer system. The sequence of video frames may be transmitted over a cable, e.g., a CAT 5 cable, to a plurality of frame grabbers, where each frame grabber is coupled to the cable and a respective one of the plurality of display devices.

Each frame grabber may examine the sequence of video frames, select a video frame from the sequence of video frames based on the frame identifier, where the frame identifier designates one of the plurality of display devices upon which the video frame is to be displayed, and forwards the video frame to the designated one of the plurality of display devices. As described above, in one embodiment, each frame grabber may include an analog-to-digital converter (ADC) coupled to the cable, a digital-to-analog converter (DAC) coupled to one of the plurality of display devices, a memory coupled to both the ADC and the DAC, and a memory manager coupled to the memory.

As also described above, in one embodiment, the computer system 102 may be located in a first location, and each of the plurality of display devices may be located in a second location, where the second location is remote from the first location. Thus, in one embodiment, bus extension technologies may be used to transmit the video frames, e.g., the image data, from the computer system to the plurality of display devices, such as disclosed in various of the patent applications incorporated by reference above.

As described above, the analyzing and updating described above are preferably performed by a computer system coupled to the plurality of display devices via a cable, e.g., a serial cable, such as a CAT 5 cable. Additionally, in a preferred embodiment, the computer system comprises a blade computer, including a processor, a memory, and a video processor. In one embodiment, the computer system may be included in a computing system, where the computing system includes a plurality of co-located blade computers. For more information on blade computers and co-located computer systems, please see U.S. patent application Ser. No. 09/728,667 titled "Computer On A Card With A Remote Human Interface" filed on Dec. 1, 2000, and U.S. patent application Ser. No. 09/728,669 titled "A System Of Co-Located Computers In a Framework Including Removable Function Modules for Adding Modular Functionality" filed on Dec. 1, 2000, which were incorporated by reference above. It should be noted that the use of a blade computer as the computer 102 is meant as an example only, and is not intended to limit the type of computer 102 used in the system to any particular type or form.

Figure 15B:
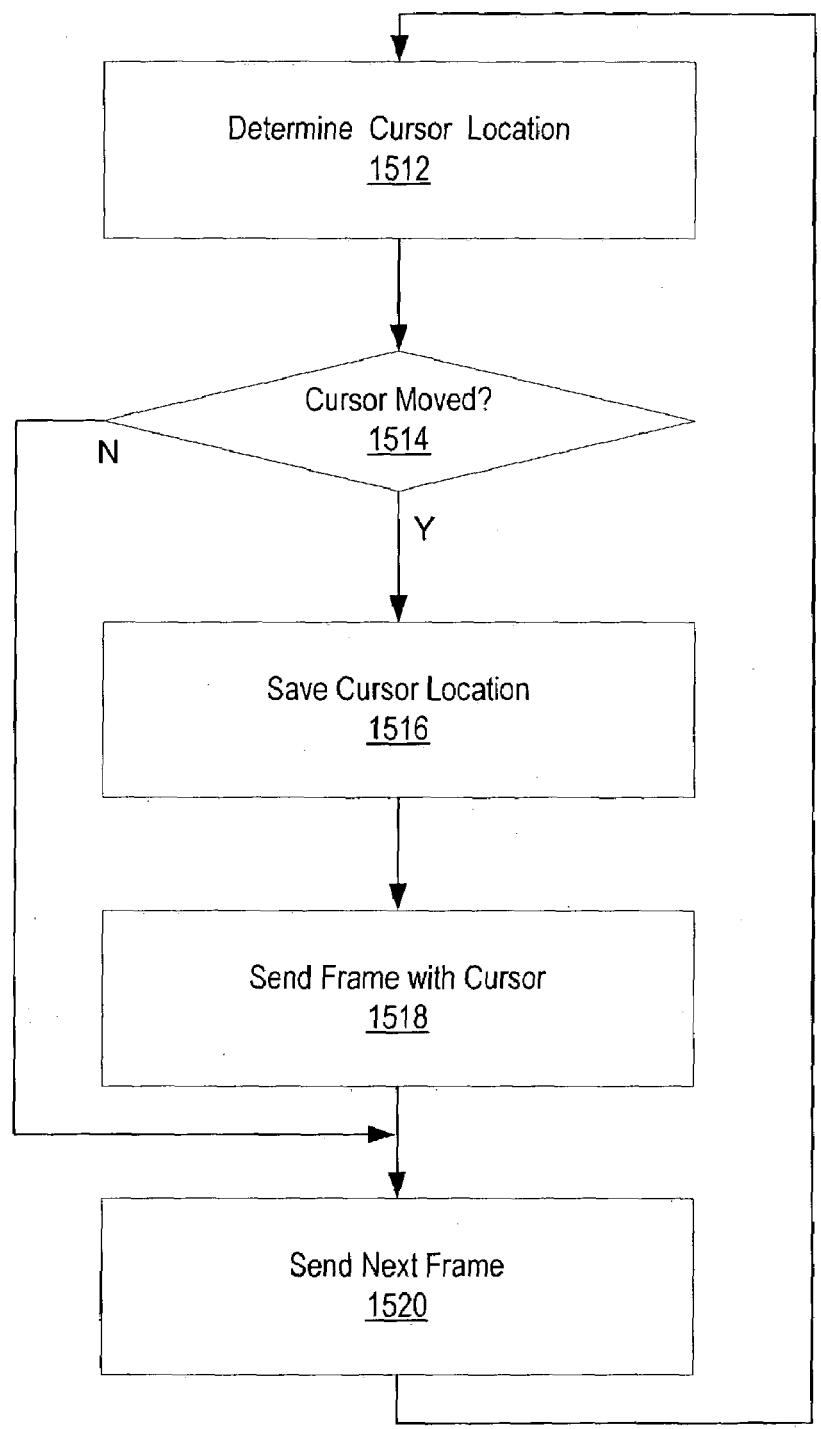
FIG. 15B flowcharts one embodiment of a method for transmitting video images from a computer system to multiple display devices.

A more specific embodiment of the method of FIG. 15A is shown in FIG. 15B, and described below.

FIG. 15B is a flowchart diagram of a different embodiment of the method described above with reference to FIG. 15A. More specifically, the method illustrated in FIG. 15B relates to selective updating of display devices based on cursor (e.g., mouse) movement, where determination of an active frame (the cursor frame) is used to determine the video frame sequence sent to the plurality of display devices. It is noted that the embodiment described with reference to FIG. 15B is meant to be exemplary, and is not intended to limit the invention to any particular functionality.

As FIG. 15B shows, in 1512, a cursor location or position may be determined. For example, software, e.g., driver software, executing on computer system 102 may determine on which display device the cursor is currently displayed, e.g., may determine the cursor frame, as well as the cursor's position on that display device, e.g., the cursor's position in the video frame for that display device, e.g., the cursor's position on the display screen or viewable region. It is noted that the cursor position may correspond to relative positions or movement of any type of pointing device, including, but not limited to, a mouse, keyboard, trackball, head-tracking device, touch-screen, touch-pad, stylus, and light-pen, among others. As is well known in the art of multi-display device systems, a user may use the pointing device to move the cursor not only over the display of the display device currently displaying the cursor, but may also move the cursor onto or across any of the other displays, as well.

Once the cursor position is determined, then in 1514, a determination may be made as to whether the cursor has moved. For example, the method may compare the current position of the cursor with a previous position, where a difference between the two positions indicates that cursor movement has occurred.

If no cursor movement is detected, then the method may proceed to 1520, where the next video frame is inserted into the frame sequence, e.g., for transmission to the display devices, as described above in detail. In other words, if no cursor movement is detected, then no selective updating may occur, i.e., no active frame is determined, and thus, the normal video frame sequence is used.

If in 1514, cursor movement is detected, then in 1516, the current cursor location or position may be saved, e.g., stored in a memory medium of the computer system 102, and, in 1516, the video frame with the cursor may be inserted into the video frame sequence for transmission to the plurality of display devices. In other words, the cursor frame may be sent for display, after which the next frame may be sent, as indicated in 1520. Said another way, the cursor frame is determined to be the active frame, and may be inserted into the video frame sequence before the normal "next" frame in the sequence, thereby selectively updating the image data containing the (moving) cursor at a higher rate than the image data of video frames associated with the other display devices.

Note that in this example embodiment, steps 1512 and 1514 may correspond to step 1502 in the method of FIG. 15A, step 1516 may correspond roughly with step 1506, and steps 1518 and 1520 may correspond to step 1508.

As FIG. 15B indicates, the method described above is preferably performed in an iterative manner, where after the next frame is sent in 1520, the method may proceed to step 1512, and continue as described above. Thus, over a series of these iterations, if the cursor continues to move, then the determined cursor frame will be inserted or interleaved between each of the other frames, thereby updating that frame at an effective update rate greater than that of the other frames. Thus, the active frame may be updated at a first rate, and the other frames updated at a second rate, where the first rate is greater than the second.

Thus, the method described above with reference to FIG. 15B is an exemplary embodiment of the method of FIG. 15A, wherein the active frame is determined using respective levels of peripheral activity associated with each display device. More specifically, in the embodiment of FIG. 15B, determining respective levels of peripheral activity associated with each display device includes determining a cursor location for a current iteration, where the cursor location is associated with a first display device of the plurality of display devices, and determining if the cursor location has changed since a previous iteration.

In this embodiment, updating the plurality of display devices in accordance with said analyzing includes updating the first display device at a first update rate if the cursor location has changed since a previous iteration, and at a second update rate if the cursor location has not changed since the previous iteration. The others of the plurality of display devices are updated at the second update rate, where the first update rate is greater than the second update rate.

Additionally, in one embodiment, updating the plurality of display devices may include generating a sequence of video frames based on the first update rate and the second update rate, where each video frame is targeted to a respective display device. In one embodiment, generating the sequence of video frames based on the first update rate and the second update rate may include periodically inserting a cursor video frame into the sequence of video frames in accordance with the first update rate, where each cursor frame displays the cursor in an associated video image, and where a position of the cursor is responsive to movements of a pointing device. The sequence of video frames may then be transmitted over a cable to a plurality of frame grabbers, wherein each frame grabber is coupled to the cable and a respective one of the plurality of display devices, as described at length above.

It should be noted that in other embodiments, different update rates may be determined based on various activity metrics, as noted above. For example, rather than just two update rates, the method may determine respective update rates for each of the display devices or video frames, where each update rate is computed based on one or more metrics calculated or measured for that display device. Thus, the most active display may be updated most frequently, the next most active display(s) may be updated less frequently, the third most active display(s) updated yet less frequently, and so on.

Thus, various embodiments of the systems and methods described herein may provide selective updating of display devices based on activity associated with the display devices, and may thereby improve the quality of a user's experience, e.g., by increasing the responsiveness of the human interface, e.g., of the cursor display, by improving graphical data update rates for dynamic images, and so forth.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

I claim:

1. A method for updating a plurality of display devices used by a user, wherein the plurality of display devices comprise a first display and a second display, the method comprising:
   determining a cursor location for a current iteration, wherein the cursor location is associated with a first display device of the plurality of display devices; and
   determining if the cursor location has changed since a previous iteration;
   updating the first display according to a first update rate if the cursor location has changed since the previous iteration, and according to a second update rate if the cursor location has not changed since the previous iteration;
   updating the second display according to a third update rate.

2. The method of claim 1, wherein the first update rate is greater than the second update rate.

3. The method of claim 1, wherein the second update rate is greater than the third update rate.

4. The method of claim 1, wherein said determining the cursor location for a current iteration and said determining if the cursor location has changed since a previous iteration comprises analyzing information associated with the first display.

5. The method of claim 1, wherein said determining the cursor location for a current iteration and said determining if the cursor location has changed since a previous iteration comprises analyzing user input from a user input device.

6. The method of claim 1, wherein said determining the cursor location for a current iteration and said determining if the cursor location has changed since a previous iteration comprises analyzing information from a software program.

7. The method of claim 1, further comprising: determining that the cursor is associated with the first display.

8. The method of claim 1, wherein said determining if the cursor location has changed since a previous iteration comprises:
   computing a respective metric for the first display indicating a degree to which the cursor location has changed since the previous iteration.

9. The method of claim 1, wherein said updating the first display and said updating the second display comprise:
   generating a sequence of video frames based on the first or second update rate, and the third update rate, wherein each video frame is targeted to a respective display device; and
   transmitting the sequence of video frames over a cable to a plurality of frame grabbers, wherein each frame grabber is coupled to the cable and a respective one of said plurality of display devices.

10. The method of claim 9, wherein said generating the sequence of video frames based on the first or second update rate, and the third update rate comprises:
    periodically inserting a cursor video frame into the sequence of video frames in accordance with said first update rate, wherein each cursor frame displays said cursor in an associated video image, and wherein a position of the cursor is responsive to movements of a pointing device.

11. The method of claim 1, wherein said updating the first display and said updating the second display comprise:
    generating a sequence of video frames based on said determining if the cursor location has changed since a previous iteration, wherein each video frame includes a video image and a frame identifier, and wherein each of the video images is stored in a video processor in a computer system.

12. The method of claim 11, wherein said updating the first display and said updating the second display further comprise:
    transmitting the sequence of video frames over a cable to a plurality of frame grabbers, wherein each frame grabber is coupled to the cable and a respective one of said plurality of display devices.

13. The method of claim 12, further comprising, each frame grabber performing:
    examining the sequence of video frames;
    selecting a video frame from the sequence of video frames based on the frame identifier, the frame identifier designating one of the plurality of display devices upon which the video frame is to be displayed; and
    forwarding the video frame to the designated one of the plurality of display devices.

14. The method of claim 12, wherein the cable is a CAT 5 cable.

15. The method of claim 11,
    wherein the computer system is located in a first location; and
    wherein each of the plurality of display devices is located in a second location, the second location being remote from the first location.

16. The method of claim 11, further comprising:
    performing said determining the cursor location for a current iteration, said determining if the cursor location has changed since a previous iteration, said updating the first display, and said updating the second display in an iterative manner.

17. The method of claim 12, wherein each frame grabber comprises:
    an analog-to-digital converter (ADC) coupled to the cable;
    a digital-to-analog converter (DAC) coupled to one of the plurality of display devices;
    a memory coupled to both the ADC and the DAC; and
    a memory manager coupled to the memory.

18. The method of claim 1,
    wherein said determining the cursor location for a current iteration, said determining if the cursor location has changed since a previous iteration, said updating the first display, and said updating the second display are performed by a computer system coupled to the plurality of display devices via a cable.

19. The method of claim 18, wherein the cable is a CAT 5 cable.

20. The method of claim 19, wherein the computer system comprises a blade computer, the blade computer including a processor, a memory, and a video processor.

21. The method of claim 20, wherein the computer system is comprised in a computing system, and wherein the computing system includes a plurality of co-located blade computers.

22. A computing system with multiple display devices, comprising:
    a computer, comprising:
      a processor; and
      a memory medium coupled to the processor;
    a plurality of display devices coupled to the computer via a cable;
    wherein the memory medium stores program instructions which are executable by the processor to:

determine a cursor location for a current iteration, wherein the cursor location is associated with a first display device of the plurality of display devices;

determine if the cursor location has changed since a previous iteration;

update the first display device according to a first update rate if the cursor location has changed since the previous iteration, and according to a second update rate if the cursor location has not changed since the previous iteration; and update a second display of the plurality of display devices according to a third update rate.

23. A computer readable memory medium which stores program instructions for providing images to a plurality of display devices, including a first display device and a second display device, wherein the program instructions are executable by a processor to perform:

determining a cursor location for a current iteration, wherein the cursor location is associated with a first display device of the plurality of display devices; and determining if the cursor location has changed since a previous iteration;

updating the first display according to a first update rate if the cursor location has changed since the previous iteration, and according to a second update rate if the cursor location has not changed since the previous iteration;

updating the second display according to a third update rate.

24. A system for providing images to a plurality of display devices, the system comprising:

means for determining a cursor location for a current iteration, wherein the cursor location is associated with a first display device of the plurality of display devices; and means for determining if the cursor location has changed since a previous iteration;

means for updating the first display according to a first update rate if the cursor location has changed since the previous iteration, and according to a second update rate if the cursor location has not changed since the previous iteration;

means for updating a second display according to a third update rate.

* * * * *